(12) United States Patent
Schoenbauer et al.

(10) Patent No.: US 12,091,260 B2
(45) Date of Patent: Sep. 17, 2024

(54) CONVEYOR DEVICE FOR THE DISTANCELESS AND PRESSURELESS, OR LOW-PRESSURE, ACCUMULATION OF OBJECTS, AND OPERATING METHOD THEREFOR

(71) Applicant: TGW Mechanics GmbH, Wels (AT)

(72) Inventors: Manuel Schoenbauer, Taufkirchen an der Trattnach (AT); Florian Georg Karer, Linz (AT); Richard Grimminger, Scharten (AT); Simon Kaltseis, Haibach ob der Donau (AT); Martin Rausch, Gmunden (AT)

(73) Assignee: TGW Mechanics GmbH, Wels (AT)

( * ) Notice: Subject to any disclaimer, the term of this patent is extended or adjusted under 35 U.S.C. 154(b) by 0 days.

(21) Appl. No.: 18/218,650

(22) Filed: Jul. 6, 2023

(65) Prior Publication Data

US 2023/0348200 A1 Nov. 2, 2023

Related U.S. Application Data

(63) Continuation of application No. 17/422,995, filed as application No. PCT/AT2020/060045 on Feb. 13, 2020, now Pat. No. 11,745,953.

(30) Foreign Application Priority Data

Feb. 15, 2019 (AT) .............................. A 50117/2019

(51) Int. Cl.
- *B65G 43/10* (2006.01)
- *B65G 47/26* (2006.01)
- *B65G 47/31* (2006.01)

(52) U.S. Cl.
CPC ........... *B65G 43/10* (2013.01); *B65G 47/261* (2013.01); *B65G 47/31* (2013.01); *B65G 2201/02* (2013.01); *B65G 2203/0208* (2013.01)

(58) Field of Classification Search
CPC ...... B65G 43/10; B65G 47/261; B65G 47/31; B65G 2201/02; B65G 2203/0208
See application file for complete search history.

(56) References Cited

U.S. PATENT DOCUMENTS

| | | | |
|---|---|---|---|
| 5,335,777 A | 8/1994 | Murphy et al. | |
| 7,063,206 B2 * | 6/2006 | Haan | B65G 43/10 198/460.3 |

(Continued)

FOREIGN PATENT DOCUMENTS

| | | |
|---|---|---|
| DE | 10 2004 038 135 A1 | 3/2005 |
| EP | 2 522 602 A1 | 11/2012 |

(Continued)

OTHER PUBLICATIONS

International Search Report in PCT/AT2020/060045, mailed May 26, 2020.

*Primary Examiner* — Gene O Crawford
*Assistant Examiner* — Lester Ill Rushin
(74) *Attorney, Agent, or Firm* — Collard & Roe, P.C.

(57) ABSTRACT

A conveying device has an accumulation area for accumulating objects, and an operating method operates the conveying device. Using a measuring device, the object rear edge of a first object and the object front edge of a second object which follows the first object are detected. The position of the objects is determined using rotation signals from the drives of conveyor elements. For the second object, a continuous curve of a speed reduction of a target speed is calculated, wherein the calculated stop position of the object front edge of the second object is located at the position of the object rear edge of the stopped first object, or between the object front edge of the stopped first object and the object rear edge of the stopped first object. Subsequently, the (Continued)

second object is moved and stopped using the conveyor elements on the basis of the calculated speed reduction.

29 Claims, 21 Drawing Sheets

(56) References Cited

U.S. PATENT DOCUMENTS

| | | | |
|---|---|---|---|
| 7,542,823 B2 | 6/2009 | Nagai | |
| 9,527,679 B2 * | 12/2016 | Neiser | G05B 19/4189 |
| 9,790,035 B2 | 10/2017 | Neiser et al. | |
| 10,160,607 B2 | 12/2018 | Danelski et al. | |
| 11,459,188 B2 * | 10/2022 | Schroader | G05B 19/05 |
| 11,745,953 B2 * | 9/2023 | Schoenbauer | B65G 47/261 |
| | | | 198/459.1 |
| 2004/0144623 A1 | 7/2004 | Newsom et al. | |
| 2009/0002009 A1 | 1/2009 | Brandorff | |
| 2009/0171501 A1 | 7/2009 | Hills | |
| 2015/0047950 A1 | 2/2015 | Danelski et al. | |
| 2016/0200522 A1 * | 7/2016 | Yokoya | B65G 37/00 |
| | | | 198/460.3 |

FOREIGN PATENT DOCUMENTS

| | | |
|---|---|---|
| WO | 2011/038439 A1 | 4/2011 |
| WO | 2015/179722 A1 | 11/2015 |

* cited by examiner

CONVEYOR DEVICE FOR THE DISTANCELESS AND PRESSURELESS, OR LOW-PRESSURE, ACCUMULATION OF OBJECTS, AND OPERATING METHOD THEREFOR

CROSS REFERENCE TO RELATED APPLICATIONS

This application is a continuation of and Applicant claims priority under 35 U.S.C. § 120 of U.S. patent application Ser. No. 17/422,995 filed on Jul. 14, 2021, which application is a national stage application under 35 U.S.C. § 371 of PCT Application No. PCT/AT2020/060045 filed on Feb. 13, 2020, which claims priority under 35 U.S.C. § 119 from Austrian Patent Application No. A 50117/2019 filed on Feb. 15, 2019, the disclosures of each of which are hereby incorporated by reference. A certified copy of priority Austrian Patent Application No. A 50117/2019 is contained in parent U.S. application Ser. No. 17/422,995. The International Application under PCT article 21(2) was not published in English.

BACKGROUND OF THE INVENTION

1. Field of the Invention

The invention relates to a method for accumulating objects in an accumulation area of a conveying device in the form of object blocks comprising multiple objects moved at a common speed. In this regard, an object rear edge of a first object is detected at a first measuring position by means of a first measuring device, wherein the first object is moved past the first measuring position by driven conveyor elements of the conveying device downstream in a conveying direction and wherein the object rear edge of the first object is located upstream of an object front edge of the first object. Moreover, by means of the first measuring device, an object front edge of a second object, which follows the first object upstream, is detected at the first measuring position, wherein the second object is moved past the first measuring position downstream in the conveying direction by the driven conveyor elements and wherein the object front edge of the second object is located downstream of an object rear edge of the second object. Moreover, the first object is moved to a stop position, which is located downstream of the first measuring position in the conveying direction, and is stopped at its stop position with its object rear edge with the aid of the conveyor elements, wherein a current position of the first object, between the first measuring position and its stop position, is determined with the aid of rotation signals from the drives of the conveyor elements.

The invention also relates to a conveying device for a conveyor system for accumulating objects in an accumulation area in the form of object blocks comprising multiple objects moved at a common speed. The conveying device comprises driven conveyor elements for transporting the objects, a first measuring device for detecting an object front edge and an object rear edge of the objects at a first measuring position, wherein the object front edge is located downstream of the object rear edge in the conveying direction, and a controller which is configured for controlling the conveyor elements according to a predefined target movement of the objects, and for moving a first object to a stop position with the aid of the conveyor elements, said stop position being arranged downstream of the first measuring position in the conveying direction, stopping the first object with its object rear edge at its stop position, and determining a current position of the first object between the first measuring position and its stop position with the aid of rotation signals from the drives of the conveyor elements.

2. Description of the Related Art

Such a method and such a conveying device are in general known from the prior art. In general, two types of conveying devices for accumulating objects are common, namely a method for pressureless accumulation of objects and a method for distanceless accumulation of objects. In pressureless accumulation, distances are provided between the objects to prevent damage to the objects or another mutual influence. Due to the design, the object density that may be achieved on the conveying device is rather low. In distanceless accumulation, the objects are moved against each other with more or less momentum. This is usually carried out by having a moving second object, which follows the first object, coast down on free-running conveyor elements. Within an object block formed by multiple objects a non-negligible accumulation pressure is then created. The disadvantage of this method is that sensitive objects may easily be damaged during accumulation. This may, in particular, happen when a sensitive object in the object block comes to rest between two heavy and comparatively rigid objects.

WO 2011/038439 A1 discloses a conveyor device with an open-loop/closed-loop controller for controlling a target distance between two objects on the basis of a determined target position and sensors for checking the distance between the objects. In an alternative, an accumulation operation on the conveyor is also disclosed, in which the objects may touch each other.

SUMMARY OF THE INVENTION

Therefore, one object of the invention is to provide an improved conveying device and an improved method for accumulating objects. In particular, the accumulation of sensitive objects in a high object density is to be enabled in a simple manner.

The object according to the invention is achieved by a method of the initially mentioned type, wherein for the second object, a continuous curve of a speed reduction of a target speed is calculated, wherein the calculated stop position of the object front edge of the second object is located at the position of the object rear edge of the stopped first object, or between the object front edge of the stopped first object and the object rear edge of the stopped first object, and wherein the second object is, with the aid of the conveyor elements using the calculated speed reduction, (actively) moved and stopped, wherein a current position of the second object, between the first measuring position and its stop position, is determined with the aid of rotation signals from the drives of the conveyor elements.

The object according to the invention is also achieved by a conveying device of the initially mentioned type, wherein the controller is further configured for calculating a continuous curve of a speed reduction of a target speed for a second object, wherein the calculated stop position of the object front edge of the second object is located at the position of the object rear edge of the stopped first object, or between the object front edge of the stopped first object and the object rear edge of the stopped first object, and controlling the drives of the conveyor elements according to the calculated curve of the speed reduction, stopping the second object behind the first object using the calculated speed reduction and determining a current position of the second object, between the first measuring position and its stop position, with the aid of rotation signals from the drives of the conveyor elements.

By the suggested measures, the advantages of distanceless accumulation of objects are combined with the advantages of low-pressure or pressureless accumulation of objects. Thereby, particularly the accumulation of sensitive objects is possible in high object density. Sensitive objects, in particular, are objects that are rigid, however, are fragile, as well as soft objects that are (plastically) easily deformable. Concrete examples for sensitive objects thus are glasses, but also bags (such as polybags).

In particular, the first object, when being stopped at its stop position with the aid of the conveyor elements, is stopped with its object rear edge at an upstream zone rear edge of a first zone of multiple independently drivable zones of the conveying device in the accumulation area.

In the context of the invention, "accumulation pressure" means a pressure prevalent between the objects of an object block at border surfaces of adjacent objects.

"Low-pressure" means that the accumulation pressure is low; in particular, "low-pressure" means that a contact force (and a resulting pressure) between the objects is below the maximum friction force between the conveyor elements and the objects, especially below the maximum friction force during sliding friction.

In the context of the invention, an "object block" is a group of multiple objects, that are strung together distanceless or at a predefined distance. Another characteristic of an object block is that all objects of the object block are moved synchronously. In particular, the same target speed and/or the same curve of the target speed is defined for all objects of the object block.

The "object density" is the sum of the lengths of the objects located in the accumulation area divided by the distance between the object front edge of the object, which is located the furthest downstream in the accumulation area, and the object rear edge of the object, which is located the furthest upstream in the accumulation area.

An "isolated" object is an object not belonging to any object block. A synonymous term is "separate" object.

Further advantageous designs and further advancements of the invention are discussed below.

It is favorable for the speed reduction to have a linear course. Hence, the speed reduction may be calculated using simple algorithms.

However, it is also advantageous for the speed reduction to a have a degressive section in the area of the position of the object rear edge of the stopped first object. As a result, a residual speed at which the second object may touch the first object is smaller compared to a linear course with the same braking distance. The contact between the first and second object is then correspondingly gentler.

Moreover, it is favorable if a position for the target speed "zero" is located downstream of the object rear edge of the stopped first object and the target speed at the object rear edge of the stopped first object amounts to a maximum of 0.1 m/s. Hence, a damage of sensitive objects may be prevented even if the second object touches the first object at a residual speed.

Moreover, it is favorable if the first object and the second object are moved past the first measuring position at a constant speed. Hence, the determination of object lengths and object distances is possible in a particularly simple way.

It is also particularly advantageous if the calculation of the speed reduction
  a) is based on a virtual object rear edge of the first object, which is located downstream of a physical object rear edge of the first object, and/or
  b) is based on a virtual object front edge of the second object, which is located upstream of a physical object front edge of the second object.

The distance between the first and the second object assumed in the controller of the conveying device is thus larger than the actual distance between the two objects. This results in the actual stop position for the second object is placed further inside the first object, whereby the accumulation pressure within an object block is increased. Accordingly, the suggested approach is particularly suitable for insensitive objects. To realize this embodiment variant, the calculation of the speed reduction may generally be based on a virtual length of an object which is smaller than the physical length of an object. By the suggested measures, in particular, inevitable measuring tolerances in the determination of the object rear edge of the first object and the object front edge of the second object as well as inaccuracies in the calculation of the position of the object rear edge of the first object and the object front edge of the second object may be compensated.

However, it is also particularly advantageous if the calculation of the speed reduction
  c) is based on a virtual object rear edge of the first object, which is located upstream of a physical object rear edge of the first object, and/or
  d) is based on a virtual object front edge of the second object, which is located downstream of a physical object front edge of the second object.

Then, the distance between the first and the second object assumed in the controller of the conveying device is thus smaller than the actual distance between the two objects. This results in the actual stop position for the second object is placed further outside the first object, whereby the accumulation pressure within an object block is reduced. Accordingly, the suggested approach is particularly suitable for sensitive objects. To realize this embodiment variant, the calculation of the speed reduction may generally be based on a virtual length of an object which is larger than the physical length of an object. Hence, again, inevitable measuring tolerances in the determination of the object rear edge of the first object and the object front edge of the second object as well as inaccuracies in the calculation of the position of the object rear edge of the first object and the object front edge of the second object may be compensated.

It is particularly advantageous if the distance between the virtual object rear edge and the physical object rear edge of the first object and/or the distance between the virtual object front edge and the physical object front edge of the second object corresponds to the inaccuracy in the position determination of the first object and the second object by the measuring device plus a tolerance of ±10%. In cases a) and b), hence, distanceless accumulation is ensured only just and at minimum pressure. A (physical) distance between objects due to measuring inaccuracies may thus be precluded. In cases c) and d), in contrast, pressureless accumulation at a minimum distance is ensured by the suggested measures. In general, the calculation of the speed reduction may be based on a virtual length of an object whose difference from the physical length of this object corresponds to twice the inaccuracy in the position determination of the first object and the second object by the first measuring device plus a tolerance of ±10%. In cases a) and b), the virtual length is smaller than the physical length of an object, in cases c) and d), in contrast, it is larger. Hence, in cases a) and b), a distanceless accumulation at minimum pressure and in cases c) and d), a pressureless accumulation at minimum distance may be ensured.

It is also advantageous if a conveyor element arranged in the region of the first object is held in position once the first object has been stopped. Hence, it may be prevented that the first object is pushed away by the second object and an undesired distance between the two objects forms when the second object has been stopped. Braking may be performed with maximum braking force to prevent the first object from being pushed away in any case, or with reduced braking force to ensure that the second object drives against the first object smoothly.

In the above context, it is also advantageous if a braking torque of a conveyor element arranged in the region of the first object is measured and the second object is stopped once the braking torque exceeds a first threshold value. Hence, a defined accumulation pressure within the object block may be set.

Moreover, it is conceivable that a braking torque of a conveyor element arranged in the region of the first object is measured and the second object, after contact with the first object, is moved back and stopped if the braking torque drops below a second threshold value. Hence, it is also possible to set a defined accumulation pressure within the object block, in particular if the pressure between the first object and the second object is too large after the second object has been driven against the first object.

It is also advantageous if conveyor elements arranged in the region of the first object are switched to freewheel mode after the first object has been stopped. Hence, particularly gentle driving of the second object against the first object may be ensured.

It is particularly advantageous if
the first object, when being stopped at its stop position with the aid of the conveyor elements, is stopped with its object rear edge at an upstream zone rear edge of a first zone of multiple independently drivable zones of the conveying device in the accumulation area,
the second object is moved towards the first object with the aid of the conveyor elements, and
the first object and the second object, after the second object has been driven against the first object, become part of an object block which is moved downstream in the conveying direction at a common actual speed with the aid of the conveyor elements,
wherein the object block is stopped with the aid of the conveyor elements when it reaches, with its block rear edge, the zone rear edge of a zone following downstream, wherein a current position of the block rear edge is determined with the aid of rotation signals from the drives of the conveyor elements.

Accordingly, it is also particularly advantageous if the controller is further configured for
stopping the first object, when it is stopped at its stop position, with the aid of the conveyor elements with its object rear edge at an upstream zone rear edge of a first zone of multiple independently drivable zones of the conveying device in the accumulation area,
moving the second object towards the first object with the aid of the conveyor elements,
moving the first object and the second object, after the second object has been driven against the first object, downstream in the conveying direction at a common actual speed as an object block with the aid of the conveyor elements,
stopping the object block with the aid of the conveyor elements when it reaches, with its block rear edge, the zone rear edge of a zone following downstream, and
determining a current position of the block rear edge with the aid of rotation signals from the drives of the conveyor elements.

By the suggested measures, object blocks may be form in a very flexible manner and having practically any desired length.

The measures suggested above are also applicable independently of the measures according to other aspects of the invention and may thus be the bases for an independent invention. This invention is, in particular, defined as follows:

A method for accumulating objects in an accumulation area of a conveying device in the form of object blocks comprising multiple objects moved at a common speed, comprising the steps:
detecting an object rear edge of a first object at a first measuring position by means of a first measuring device, wherein the first object is moved past the first measuring position by driven conveyor elements of the conveying device downstream in a conveying direction and wherein the object rear edge of the first object is located upstream of an object front edge of the first object,
detecting an object front edge of a second object, which follows the first object upstream, at the first measuring position by means of the first measuring device, wherein the second object is moved past the first measuring position downstream in the conveying direction by the driven conveyor elements and wherein the object front edge of the second object is located downstream of an object rear edge of the second object,
moving the first object to a stop position, which is located downstream of the first measuring position in the conveying direction, and stopping the first object at its stop position with its object rear edge with the aid of the conveyor elements, wherein a current position of the first object, between the first measuring position and its stop position, is determined with the aid of rotation signals from the drives of the conveyor elements,
wherein
the first object, when being stopped at its stop position with the aid of the conveyor elements, is stopped with its object rear edge at an upstream zone rear edge of a first zone of multiple independently drivable zones of the conveying device in the accumulation area,
the second object is moved towards the first object with the aid of the conveyor elements, and
the first object and the second object, after the second object has been driven against the first object or after the second object has a predefinable distance to the first object, become part of an object block which is moved downstream in the conveying direction at a common actual speed with the aid of the conveyor elements,
and wherein
the object block is stopped with the aid of the conveyor elements when it reaches, with its block rear edge, the zone rear edge of a zone following downstream or when it is positioned with its block rear edge at a distance downstream of one of said zone rear edges which corresponds to less than or equal to a desired distance to a following object, wherein a current position of the block rear edge is determined with the aid of rotation signals from the drives of the conveyor elements.

A conveying device for a conveyor system for accumulating objects in an accumulation area in the form of object blocks comprising multiple objects moved at a common speed, comprising:

driven conveyor elements for transporting the objects, a first measuring device for detecting an object front edge and an object rear edge of the objects at a first measuring position, wherein the object front edge is located downstream of the object rear edge of the object in the conveying direction, and a controller, which is configured for controlling the conveyor elements according to a predefined target movement of the objects, and for moving a first object to a stop position with the aid of the conveyor elements, said stop position being arranged downstream of the first measuring position in the conveying direction, to stop the first object with its object rear edge at its stop position, and to determine a current position of the first object between the first measuring position and its stop position with the aid of rotation signals from the drives of the conveyor elements, wherein the controller is further configured for stopping the first object, when it is stopped at its stop position, with the aid of the conveyor elements with its object rear edge at an upstream zone rear edge of a first zone of multiple independently drivable zones of the conveying device in the accumulation area, moving the second object towards the first object with the aid of the conveyor elements, moving the first object and the second object, after the second object has been driven against the first object or after the second object has a predefinable distance to the first object, downstream in the conveying direction at a common actual speed as an object block with the aid of the conveyor elements, stopping the object block with the aid of the conveyor elements when it reaches, with its block rear edge, the zone rear edge of a zone following downstream or when it is positioned with its block rear edge at a distance downstream of one of said zone rear edges which corresponds to less than or equal to a desired distance to a following object, and determining a current position of the block rear edge with the aid of rotation signals from the drives of the conveyor elements.

In particular, the block rear edge may correspond to the object rear edge of the second object if the second object is an isolated object (meaning that it is not part of a further object block) before the second object along with the first object becomes part of an object block, and the block rear edge may correspond to the object rear edge of a third object if the second object and the third object are already part of an object block before the first object is added to this object block, wherein the third object is arranged at the upstream end of the object block (irrespective of whether the first object is already part of an object block before the second and third objects are added to this object block).

Accordingly, the block rear edge is not static but varies with the length of the object block. The case in which the second object is an isolated object may also be considered a special case of an object block to which merely the second object belongs.

It is particularly advantageous if it is checked whether a group of successive objects, including the first and the second objects, fits into a zone or into a group of successive zones (which is as small as possible) located downstream of the last object of the group, and an object block is formed from the objects of the group only if the result of the check is positive, and otherwise the second object is stopped with its object rear edge at a zone rear edge of a second zone of the accumulation area or is stopped at a distance downstream of one of said zone rear edges which corresponds to less than or equal to a desired distance to a following object, wherein the second zone is arranged behind the first zone, in particular directly behind the first zone. Hence, an object block is formed when it can successfully be accommodated in a group of zones (which is as small as possible) or even in one zone. If this is not possible, the object is positioned such that it may easily become part of an object block with a following object.

In the above context, it is particularly advantageous if the object block is formed without intermediate stop of the objects of the group following the first object when the result of the check is positive. Frequently, the check elucidated above can already be carried out while the objects are still in motion. In particular, this is the case when multiple objects pass the first measuring device at a small distance. If the check for the objects still in motion leads to a positive result, then these objects immediately become part of an object block, i.e. without stopping at an intermediate stop. The formation of an object block takes place particularly quickly in this way, which means that the object density on the conveying device may be increased rapidly.

In this regard, the term "intermediate stop" generally refers to a stop of the second object which may be provided additionally to stopping the second object behind the first object for the purpose of block formation (or block enlargement). For block formation or block enlargement, the second object is briefly stopped behind the first object so as to be able to subsequently accelerate both objects together to a target speed.

Moreover, it is advantageous if all objects are stopped successively in time in the same zone, said zone being arranged in particular directly behind a measuring area containing the first measuring device. Hence, the method for forming an object block may be implemented with a particularly low control engineering effort. In this regard, the object block is formed starting from an upstream area of the conveying device, in particular starting from the upstream end of the accumulation area.

However, it is also advantageous if the objects are stopped in different zones, in particular starting at the downstream end of the accumulation area. Thus, the objects may be transported out of the accumulation area particularly quickly in case of a corresponding arrangement. In this embodiment variant, the object block is formed starting from a downstream area of the conveying device, in particular starting from the downstream end of the accumulation area.

Moreover, it is advantageous if an object leading in the accumulation area is not a part of an object block or is isolated therefrom. Thus, it is possible to quickly transport a single object out of the accumulation area when a corresponding request is received (for example from a higher-level controller).

In the above context, it is also advantageous if an object following the leading object is detached from an object block and moves to the downstream end of the accumulation area if it is part of an object block and if the leading object leaves the accumulation area. Thus, it is repeatedly possible to quickly transport a single object out of the accumulation area when a corresponding request is received (for example from a higher-level controller). Detachment from the object block takes place in particular when the object rear edge of the object to be detached reaches a zone rear edge (or zone front edge) of a zone.

It is also advantageous if objects following the leading object are detached from an object block if these are part of an object block and are to leave the accumulation area as planned together with the leading object, wherein the detachment from the object block takes place when the object rear edge of the last object of the object block to be detached reaches a zone rear edge (or zone leading edge) of a zone. This makes it possible to transport an object block away from the accumulation area when a corresponding request is received, even if the object block to be transported away is part of a larger object block.

Moreover, it is advantageous if at least one object following the leading object drives against the leading object if said objects are to leave the accumulation area as an object block according to plan. This makes it possible to transport an object block away from the accumulation area when a corresponding request is received, even if the leading object is an isolated object.

Moreover, it is particularly advantageous if an object block is formed merely up to a maximum length, for example up to a maximum length of 10 m. Thus, the reaction time when transporting objects out of the accumulation area is improved. The possibility of dividing object blocks is also improved since the mass of a partial block is limited by the maximum block length and thus its operability is facilitated.

It is also advantageous if the suggested method for accumulating objects comprises multiple operation modes selectable from the group of:
  method according to one aspect of the invention (formation of an object block starting out from an upstream area of the conveying device),
  method according to another aspect of the invention (formation of an object block starting out from a downstream area of the conveying device),
  method according to one aspect of the invention in combination with a method according to a further aspect of the invention (formation of an object block starting out from an upstream area of the conveying device with an additional isolated, leading object),
  method according to another aspect of the invention in combination with a method according to a further aspect of the invention (formation of an object block starting out from a downstream area of the conveying device with an additional isolated, leading object)
between which switching is possible.

Hence, the conveying device may well be adapted to diverse requirements.

Accordingly, switching is possible between the following operating modes:
  A) all objects are stopped successively in time in the same zone, wherein said zone is arranged in particular directly behind a measuring area containing the first measuring device, or
  B) the objects are stopped in different zones, in particular starting at the downstream end of the accumulation area.

The operating modes A) and B) may each be added the feature that C) an object leading in the accumulation area does not become part of an object block or is isolated therefrom.

In each case of feature C), the feature may be added that D) an object following the leading object is detached from an object block and moves to the downstream end of the accumulation area if it is part of an object block and if the leading object leaves the accumulation area.

In each case of features C) and D), the feature may be added that E) objects following the leading object are detached from an object block if these are part of an object block and are to leave the accumulation area as planned together with the leading object, wherein the detachment from the object block takes place when the object rear edge of the last object of the object block to be detached reaches a zone rear edge of a zone.

In each case of features C), D) and E), the feature may be added that F) at least one object following the leading object drives against the leading object if said objects are to leave the accumulation area as an object block according to plan.

Lastly, in each case of features C), D), E) and F), the feature may be added that G) and object block is formed merely up to a maximum length.

Thus, the following operating modes are conceivable: A, A+C, A+C+D, A+C+E, A+C+D+E, A+C+F, A+C+D+F, A+C+E+F, A+C+D+E+F, A+C+G, A+C+D+G, A+C+E+G, A+C+D+E+G, A+C+F+G, A+C+D+F+G, A+C+E+F+G, A+C+D+E+F+G as well as B, B, B+C, B+C+D, B+C+E, B+C+D+E, B+C+F, B+C+D+F, B+C+E+F, B+C+D+E+F, B+C+G, B+C+D+G, B+C+E+G, B+C+D+E+G, B+C+F+G, B+C+D+F+G, B+C+E+F+G, B+C+D+E+F+G.

Moreover, it is favorable if the conveying device comprises a measuring area arranged upstream of the accumulation area, in which measuring area the object front edge and the object rear edge are detected by the first measuring device. Hence, the objects may be moved in the measuring area, in particular at a constant speed, irrespectively of processes in the accumulation area.

It is also favorable if
  at least one second measuring position is arranged downstream of the first measuring position in the detection area of the first measuring device or of a second measuring device, and
  the controller is additionally configured for resetting the current position of an object determined with the aid of the rotation signals from the drives of the conveyor elements to a value of the second measuring position if the respective object is detected at the second measuring position.

Hence, inevitable measuring tolerances in the determination of the object rear edge of the first object and the object front edge of the second object as well as inaccuracies in the calculation of the position of the object rear edge of the first object and the object front edge of the second object may be compensated. Due to said measuring tolerances, the actual position of an object in the controller is not precisely known, but the known position is merely a position approximated to the actual position. However, during resetting the known position of the second measuring device is again set as the position of the passing object. The position of the object known to the controller then again corresponds to the actual position of the object. The mentioned measures are not limit to one (single) second measuring position, but multiple second measuring positions and/or measuring devices may be provided in the course of the conveying device so as to more often align the position of an object present in the controller with the actual position of the respective object, and/or to prevent measurement-related errors from becoming too large.

Lastly, it is favorable if a light barrier, a camera or a laser scanner is provided as the measuring device. These devices represent tested and easily available means for determining the position of an object. At this point, it should also be noted that not in each measuring position a separate measuring device must be present. Rather, it is conceivable that one measuring device may detect multiple measuring positions. This applies in particular to cameras and laser scanners.

At this point, it should be noted that the variants and advantages disclosed for the presented conveying device can likewise refer to the presented method and vice versa.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

Figure 1:
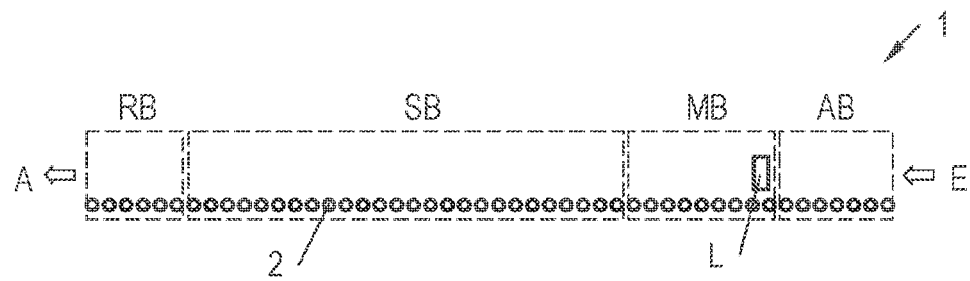
FIG. 1 shows the general structure of an exemplary conveying device in a lateral view.
Figure 2:
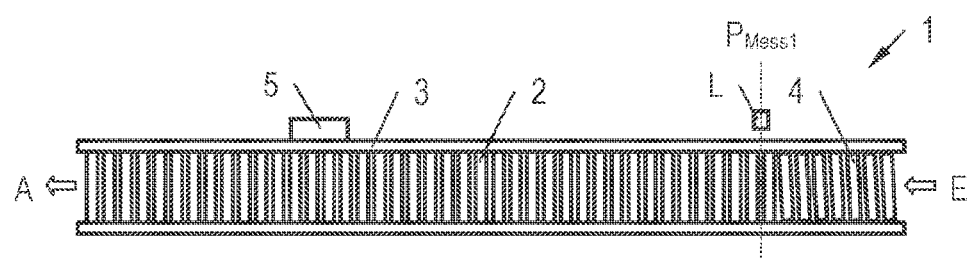
FIG. 2 shows the conveying device from FIG. 1 in a top view.
Figure 3:
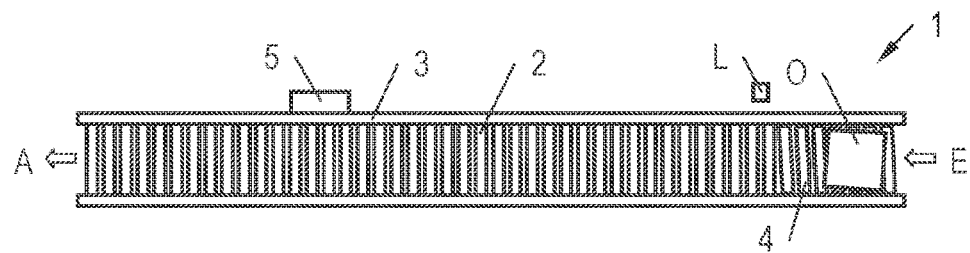
FIG. 3 as FIG. 2, but with an object in general position in the alignment area.
Figure 4:
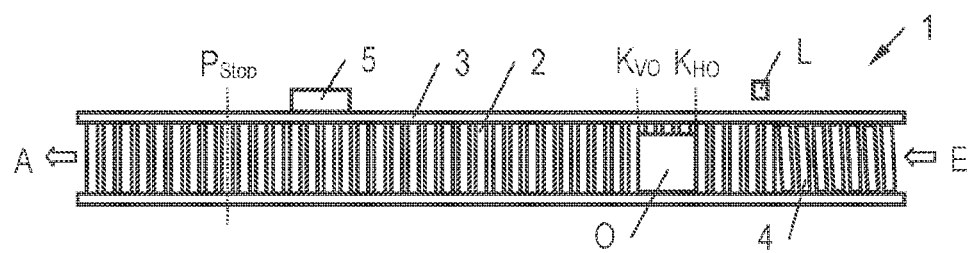
FIG. 4 as FIG. 3, but with the longitudinally aligned object in the measuring area.

FIGS. 1 to 4 show a conveying device 1 for a conveyor system for accumulating objects O in the form of object blocks. FIG. 1 shows the conveying device 1 in a lateral view, FIGS. 2 to 4 show it in a top view.

The conveying device 1 is divided into an accumulation area SB, an optional measuring area MB, an optional alignment area AB and an optional dissolving area RB. The measuring area MB is arranged upstream of the accumulation area SB, the alignment area AB is arranged upstream of the measuring area MB, and the dissolving area RB is arranged downstream of the accumulation area SB. An inflow of objects O takes place at the entry E of the conveying device 1, an outward transport via the exit A. The conveying direction symbolized by arrows runs from right to left in FIGS. 1 to 4 (and also in all following figures). Positions that follow another position in the conveying direction are located "downstream". Positions that precede another position in the conveying direction are located "upstream". Thus, entry E is located upstream of exit A and exit A is located downstream of entry E.

The conveying device 1 comprises multiple driven conveyor elements 2 for transporting the objects O. In the example shown, the conveyor elements 2 are specifically designed as conveyor rollers arranged between two longitudinal beams 3. In the alignment area AB, alignment elements 4 are arranged which in the example shown are designed as obliquely arranged alignment rollers 4.

The conveying device 1 also comprises a first measuring device L for detecting an object front edge $K_{VO}$ and an object rear edge $K_{HO}$ of the object O at a first measuring position $P_{Mess1}$, wherein the object front edge $K_{VO}$ is located downstream of the object rear edge $K_{HO}$ of the object O in the conveying direction. The measuring device L is designed as a light barrier in the concrete example shown, but it may also be formed by a camera, a laser scanner or the like, for example.

Finally, the conveying device 1 also comprises a controller 5, which in the example shown is arranged on one of the longitudinal beams 3 and is connected in terms of control technology to the conveyor rollers 2 via control lines or a control bus that are not shown.

The function of the conveying device 1 shown in FIGS. 1 to 4 is as follows:

From a conveyor not shown, which is located upstream of the conveying device 1 shown in FIGS. 1 to 4, the object O is transported and transferred to the alignment area AB in FIG. 3. The object O is transported in the conveying direction over the conveying device 1 by the alignment rollers 4 and the conveyor rollers 2. In this regard, the inclined alignment rollers 4 ensure that the object O reaches the subsequent measuring area MB in a predefined alignment, namely by aligning a side edge of the object O with one of the longitudinal beams 3. The alignment of the object O shown is purely exemplary, and other methods of aligning the object O are of course possible. The alignment area AB is, as mentioned, purely optional and may also be omitted.

In the measuring range MB, the object O driven by the conveyor rollers 2 passes, at the first measuring position $P_{Mess1}$, the light barrier L, which determines the object front edge $K_{VO}$ and the object rear edge $K_{HO}$ of the object O. The current position of the object O on the conveying device 1 can now be determined at any time with the aid of rotation signals from the drives of the conveyor rollers 2. For this purpose, for example, the signals from a rotary encoder coupled to the conveyor roller 2 or the signals from a Hall sensor of the drive motor of the conveyor roller 2 are analyzed. Using these signals, the position of the conveyor roller 2, the rotational speed of the conveyor roller 2 and the number of rotations of the conveyor roller 2 that it has completed since a certain point in time can be determined. The number of rotations of the conveyor roller 2 multiplied by the circumference of the conveyor roller 2 results in the (theoretical) position of the object O.

With the aid of the controller 5, the drives of the conveyor rollers 2 are controlled according to a predefined target motion of the object O. For example, with the aid of the conveyor rollers 2, the object O is moved to a stop position $P_{Stop}$, which is located downstream of the first measuring position $P_{Mess1}$ in the conveying direction and is stopped there.

The dissolving area RB serves for dissolving object blocks as well as creating (predefined or randomly occurring) distances between multiple objects O that have left the accumulation area SB. This is achieved in particular by a downstream section in the dissolving area RB is driven with a higher conveying speed than an upstream section. The objects O are hence automatically spaced apart.

Figure 5:
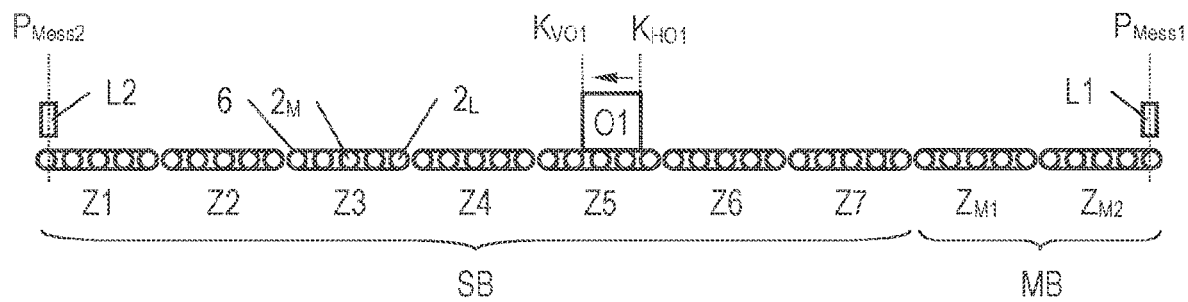
FIG. 5 shows a detailed side view of a conveying device with a first object moving thereon.
Figure 6:
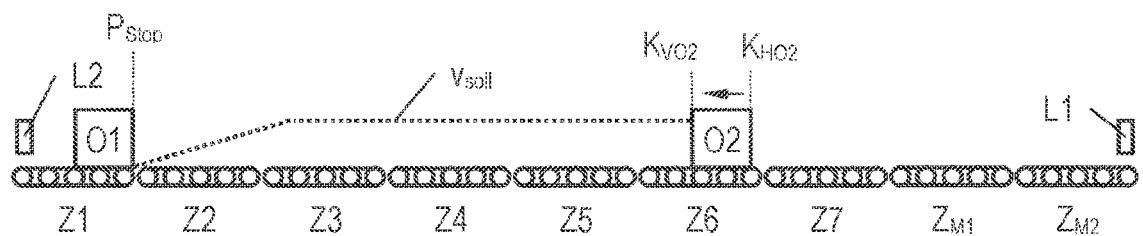
FIG. 6 as FIG. 5, but with a second object to be linearly decelerated according to a planned speed progression.
Figure 7:
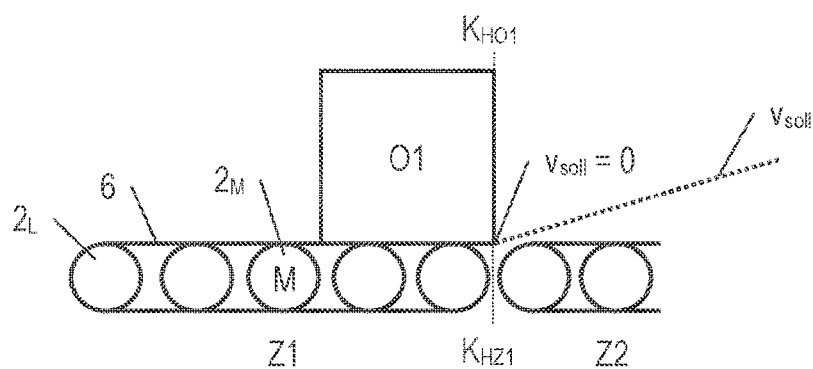
FIG. 7 shows a detail view of FIG. 6 with a speed progression of the second object ending at the object rear edge of the first object.

FIGS. 5 to 7 show a first example of how the formation of an object block may take place. In this regard, FIGS. 5 and 6 show the accumulation area SB and the measuring area MB of a conveying device 1 in a lateral view. FIG. 7 shows a detail view of the accumulation area SB. There, in particular, the motor M of the motorized conveyor roller $2_M$ is indicated.

The accumulation area SB is divided into seven zones Z1 . . . Z7 by way of example in FIGS. 5 to 7. Each zone Z1 . . . Z7 comprises a motorized conveyor roller $2_M$ and multiple (presently four) non-motorized conveyor rollers $2_L$, which are driven by the motorized conveyor roller $2_M$ via a belt 6. Each zone Z1 . . . Z7 may thus be driven independently. This means that the conveying speed in the Zone Z1 may be set independently of the conveying speed in other zones Z2 . . . Z7, and so on. However, the conveying speed is the same within one zone Z1 . . . Z7.

At this point, it should be noted that the grouping of a motorized conveyor roller $2_M$ with four non-motorized conveyor rollers $2_L$ is purely exemplary and the conveyor rollers $2_M$, $2_L$ can also be grouped in other ways. For example, it would be conceivable for two motorized conveyor rollers $2_M$ to be combined with five non-motorized conveyor rollers $2_L$ to form a group and thus a correspondingly larger zone Z1 . . . Z7. It would also be conceivable for all conveyor rollers 2 in the accumulation area SB to be motorized and for grouping via belts 6 to be omitted. Each conveyor roller 2 can then form a zone Z1 . . . Z7. Motorized conveyor rollers $2_M$ can also be grouped into a zone Z1 . . . Z7 purely in terms of control technology (i.e. without belts 6). It is of course also conceivable that a zone Z1 . . . Z7 is formed by a conveyor belt or a conveyor chain which is guided over the conveyor rollers 2.

In the measuring area MB, the first light barrier L1 is arranged at a first measuring position $P_{Mess1}$. In the example shown, the measuring area MB also has two zones $Z_{M1}$ and $Z_{M2}$, which can basically be structured in the same way as the zones Z1 . . . Z7. These zones $Z_{M1}$, $Z_{M2}$ may also be controlled individually, but as a rule these zones $Z_{M1}$, $Z_{M2}$ are operated synchronously. A separation of the measuring area MB into multiple zones $Z_{M1}$, $Z_{M2}$ is therefore not obligatorily necessary. Of course, the measuring range MB may also comprise a different number of zones $Z_{M1}$, $Z_{M2}$.

At the downstream end of the accumulation area SB, a second measuring device L2 in the form of a light barrier is also arranged at a second measuring position $P_{Mess2}$, the significance of which will be explained later.

A motion of an object O1, O2 is symbolized in FIGS. 5 and 6 (and also in all subsequent figures) by an arrow drawn above the object O1, O2 concerned. If there is no arrow above the object O1, O2, it is stationary at the time shown.

In FIG. 5, a first object O1 moves over the conveying device 1 and is located in zone Z5 at the time shown. At the time shown in FIG. 6, the first object O1 has been stopped at the stop position $P_{Stop}$ in zone Z1. A second object O2 is currently moving and is located in zone Z6.

The first object O1 has an object front edge $K_{VO1}$ and an object rear edge $K_{HO1}$. Likewise, the second object O2 has an object front edge $K_{VO2}$ and an object rear edge $K_{HO2}$. When the first light barrier L1 is passed at the measuring position $P_{Mess1}$, at least the object rear edge $K_{HO1}$ of the first object O1 and the object front edge $K_{VO2}$ of the second object O2 are detected, such that their positions on the conveyor device 1 subsequently can be calculated for each point in time via the rotation signals from the drives M of the conveyor rollers $2_M$, $2_L$. It is useful to also detect the object front edge $K_{VO1}$ of the first object O1 and the object rear edge $K_{HO2}$ of the second object O2, such that the indicated method may be repeated recursively for a desired number of objects O1, O2, and object blocks of any length may be formed. In particular, the lengths of the objects O1, O2 and/or the distances between the objects O1, O2 can also be determined.

Advantageously, the first object O1 and the second object O2 are moved past the first measuring position $P_{Mess1}$ at a constant speed and, in particular, at the same speed. In general, however, it would also be conceivable for the two objects O1, O2 to be moved past the first measuring position $P_{Mess1}$ at different (but constant) speeds or at varying (i.e. non-constant) speeds.

For the second object O2, the controller 5 now calculates a continuous course of a speed reduction of a target speed $v_{soll}$, wherein the calculated stop position $P_{Stop}$ of the object front edge $K_{VO2}$ of the second object O2 in this example lies at the position of the object rear edge $K_{HO1}$ of the stopped first object O1. At the stop position $P_{Stop}$, the target speed $v_{soll}=0$. The course of the target speed $v_{soll}$ is shown in detail in FIG. 7.

Subsequently, the second object O2 is moved and stopped by means of the conveyor rollers $2_M$, $2_L$ on the basis of the calculated speed reduction, wherein a current position of the second object O2 between the first measuring position $P_{Mess1}$ and its stop position $P_{Stop}$ is determined in the manner already described with the aid of rotation signals from the drives M of the conveyor rollers $2_M$, $2_L$. By means of the proposed measures, the second object O2 can be stopped in such a way that a distanceless and pressureless accumulation of objects O1, O2 and/or a distanceless and pressureless formation of object blocks is possible. Of course, more objects may be added to the object block, which comprises the first object O1 and the second object O2, in the described manner.

Figure 8:
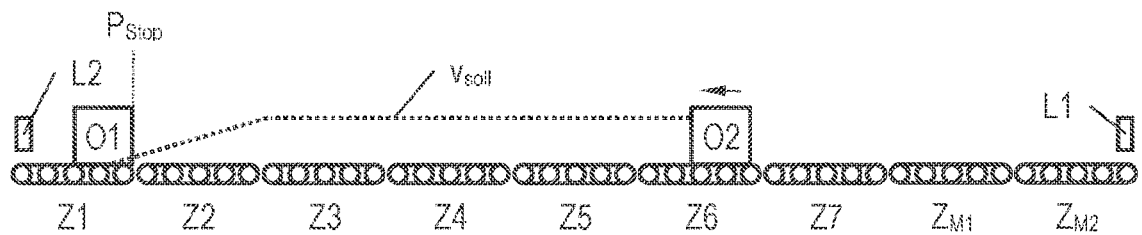
FIG. 8 similar to FIG. 6, but with a speed progression for the second object ending downstream of the object rear edge of the first object.
Figure 9:
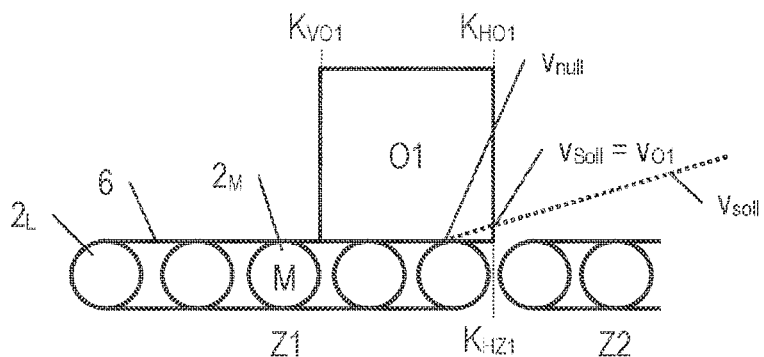
FIG. 9 a detail view of FIG. 8.

FIGS. 8 and 9 show a situation which is very similar to the situation shown in FIGS. 6 and 7. As opposed to this, the calculated stop position $P_{Stop}$ of the object front edge $K_{VO2}$ of the second object O2, at which $v_{soll}=0$ applies to the target speed, is now located between the object front edge $K_{VO1}$ and the object rear edge $K_{HO1}$ of the stopped first object O1. At the object rear edge $K_{HO1}$ of the stopped first object O1, the target speed is $v_{soll}=v_{O1}>0$. This means that the second object O2, as planned, approaches the first object O1 with a residual speed $v_{O1}$.

Thus, inevitable measuring tolerances in the determination of the object rear edge $K_{HO1}$ of the first object O1 and the object front edge $K_{VO2}$ of the second object O2 as well as inaccuracies in the calculation of the position of the object rear edge $K_{HO1}$ of the first object O1 and the object front edge $K_{VO2}$ of the second object O2 may be compensated. This means that it may be ensured that the second object O2 in fact touches the first object O1 after stopping. By means of the proposed measures, the second object O2 can be stopped in such a way that a distanceless and low-pressure accumulation of objects O1, O2 and/or a distanceless and low-pressure formation of object blocks is possible.

Without additional measures, the mentioned measuring tolerances may result in that the second object O2 does not drive against the first object O1. However, the measuring tolerances may also result in that the second object O2 drives against the first object O1 stronger than planned. If many objects O1, O2 are involved in a formation of an object block, however, the objects O1, O2 in sum usually align themselves well to an object block in which there is only little accumulation pressure between the objects O1, O2, even if not all objects O1, O2 immediately drive against one another closely.

Figure 10:
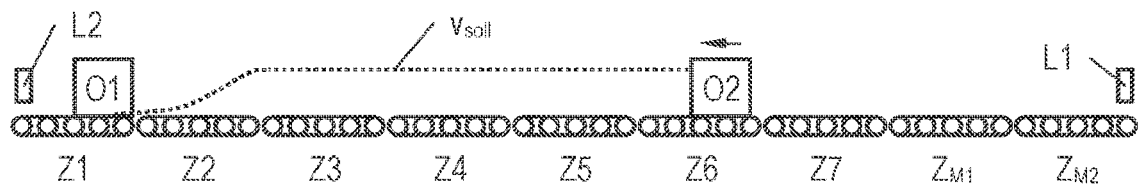
FIG. 10 is similar to FIG. 8, but with a speed progression for the second object having a degressive section.
Figure 11:
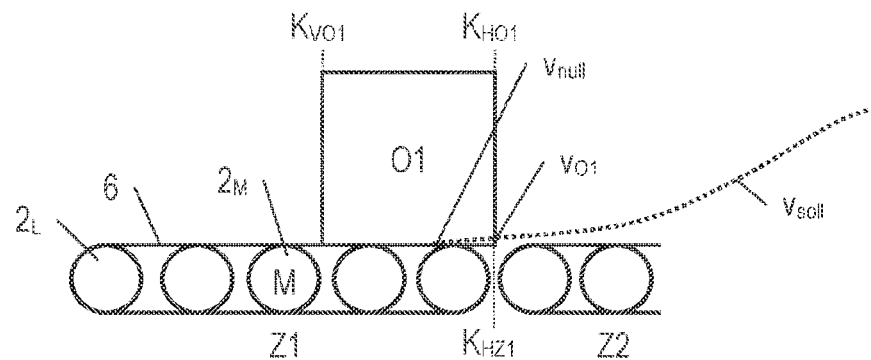
FIG. 11 shows a detail view of FIG. 10.

FIGS. 9 and 10 show a situation which is very similar to the situation shown in FIGS. 8 and 9. However, now, the speed reduction does not have a linear course, as is the case in the examples shown in FIGS. 5 to 9. Instead, the speed reduction has a degressively extending section in the region of the object rear edge $K_{HO1}$ of the stopped first object O1. This means that at the beginning of the braking process, the second object O2 is decelerated stronger than at the end of the braking process. It becomes clear from the comparison of FIGS. 10 and 11 with FIGS. 8 and 9 that the residual speed $v_{O1}$ planned at the object rear edge $K_{HO1}$ of the stopped first object O1 is now significantly smaller for the target speed $v_{soll}=0$ for the same braking distance and same position. Accordingly, the second object O2 drives against the first object O1 more smoothly. By means of the proposed measures, the second object O2 can be stopped in such a way that a distanceless and lower-pressure accumulation of objects O1, O2 and/or a distanceless and lower-pressure formation of object blocks is possible.

It is additionally noted that the speed reduction can of course also have a degressively extending section in the region of the position of the object rear edge $K_{HO1}$ of the stopped first object O1 if the calculated stop position $P_{Stop}$ of the object front edge $K_{VO2}$ of the second object O2 is at the position of the object rear edge $K_{HO1}$ of the stopped first object O1. Accordingly, a degressive speed progression may also be applied in the case shown in FIGS. 5 to 7.

Preferably, the planned residual speed $v_{O1}$ at the object rear edge $K_{HO1}$ of the stopped first object O1 amounts to a maximum of 0.1 m/s. Hence, damage to the objects O1, O2 during the formation of object blocks may well be prevented.

In the examples described, the first object O1 is stopped with its object rear edge $K_{HO1}$ and the second object O2 is stopped with its object front edge $K_{VO2}$ at an upstream zone rear edge $K_{HZ1}$ of the first zone Z1. However, this is not an obligatory condition for the described method, and the stop position $P_{Stop}$ may in general also be located elsewhere on the conveying device 1.

In order to ensure that objects O1, O2 are accumulated without distance and with low pressure, other, different strategies may be used.

For example, the conveyor rollers $2_M$, $2_L$ arranged in the area of the first object O1 may be held in position after the first object O1 has been stopped. Hence, it is prevented that the first object is pushed away by the second object and an undesired distance between the two objects O1, O2 forms when the second object has been stopped. Braking may be performed with maximum braking force to prevent the first object O1 from being pushed away in any case, or with reduced braking force to ensure that the second object O2 drives against the first object O1 smoothly. In this context, it is also advantageous if the conveyor rollers $2_M$, $2_L$ arranged in the region of the first object O1 are switched to freewheel mode after the first object O1 has been stopped. Hence, particularly gentle driving of the second object O2 against the first object O1 may be ensured.

Moreover, it is conceivable that a braking torque of a conveyor roller $2_M$, $2_L$ arranged in the region of the first object O1 is measured and the second object O2 is stopped once the braking torque exceeds a first threshold value. Hence, a defined accumulation pressure within the object block may be set.

Moreover, it is conceivable that a braking torque of a conveyor roller $2_M$, $2_L$ arranged in the region of the first object O1 is measured and the second object O2, after contact with the first object O1, is moved back and stopped if the braking torque drops below a second threshold value. Hence, it is also possible to set a defined accumulation pressure within the object block, in particular if the pressure between the first object O1 and the second object O2, for the moment, is too large after the second object O2 has been driven against the first object.

So as to compensate inevitable measuring tolerances in the determination of the object rear edge $K_{HO1}$ of the first object O1 and the object front edge $K_{VO2}$ of the second object O2 as well as inaccuracies in the calculation of the position of the object rear edge $K_{HO1}$ of the first object O1 and the object front edge $K_{VO2}$ of the second object O2, the calculation of the speed reduction may also be based on virtual object edges.

For example, it is conceivable that the calculation of the speed reduction
  a) is based on a virtual object rear edge $G_{HO1}$ of the first object O1, which is located downstream of the physical object rear edge $K_{HO1}$ of the first object O1, and/or
  b) is based on a virtual object front edge $G_{VO2}$ of the second object O2, which is located upstream of the physical object front edge $K_{VO2}$ of the second object O2.

The distance between the two objects O1, O2 assumed in the controller 5 is thus larger than the actual distance between the two objects O1, O2. In general, the calculation of the speed reduction may be based on a virtual length of an object O1, O2 which is smaller than the physical length of an object O1, O2. This results in that the actual stop position $P_{Stop}$ for the second object O2 is placed further inside the first object O1.

Figure 12:
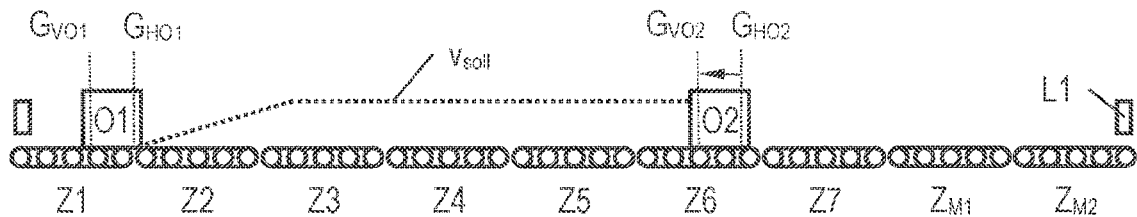
FIG. 12 is similar to FIG. 6, but with virtually shortened objects.
Figure 13:
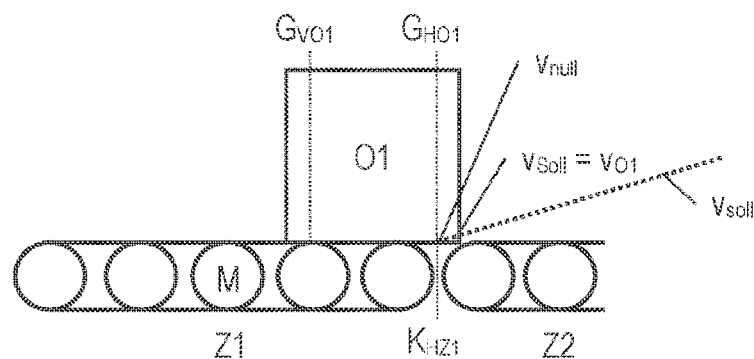
FIG. 13 shows a detail view of FIG. 12.

FIGS. 12 and 13 show an example in this regard, which is based on the case shown in FIGS. 6 and 7. For the second object O2, the controller 5 again calculates a continuous course of a speed reduction of a target speed $v_{soll}$, wherein the calculated stop position $P_{Stop}$ of the virtual object front edge $G_{VO2}$ of the second object O2 lies at the position of the virtual object rear edge $G_{HO1}$ of the first stopped object O1. Hence, the calculated stop position $P_{Stop}$ of the second physical object front edge $K_{VO2}$ of the second object O2, at which $v_{soll}=0$ applies to the target speed, is now actually located between the physical object front edge $K_{VO1}$ and the physical object rear edge $K_{HO1}$ of the stopped first object O1. This means that although, in terms of control technology, there is a situation according to FIGS. 6 and 7, actually, a situation according to FIG. 13, which is comparable to the situation present in FIG. 9, is given. By means of the proposed measures, the second object O2 is, in turn, sopped in such a way that a distanceless and low-pressure accumulation of objects O1, O2 and/or a distanceless and low-pressure formation of object blocks is possible. By increasing the accumulation pressure within an object block compared to the case according to FIGS. 6 and 7, the suggested approach is particularly suitable for insensitive objects O1, O2.

However, it would also be conceivable that the calculation of the speed reduction
  c) is based on a virtual object rear edge $G_{HO1}$ of the first object O1, which is located upstream of the physical object rear edge $K_{HO1}$ of the first object O1, and/or
  d) is based on a virtual object front edge $G_{VO2}$ of the second object O2, which is located downstream of the physical object front edge $K_{VO2}$ of the second object O2.

Thus, the distance between the two objects O1, O2 assumed in the controller 5 is then smaller than the actual distance between the two objects O1, O2. In general, the calculation of the speed reduction may be based on a virtual length of an object O1, O2 which is larger than the physical length of an object O1, O2. This results in that the actual stop position $P_{Stop}$ for the second object O2 is placed further outside the first object O1 (also cf. FIG. 82).

Figure 14:
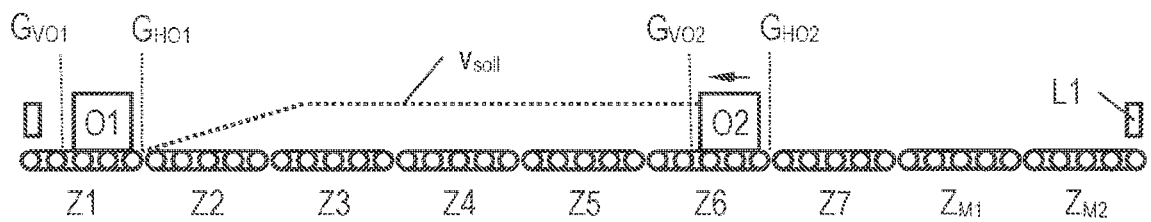
FIG. 14 is similar to FIG. 6, but with virtually enlarged objects.
Figure 15:
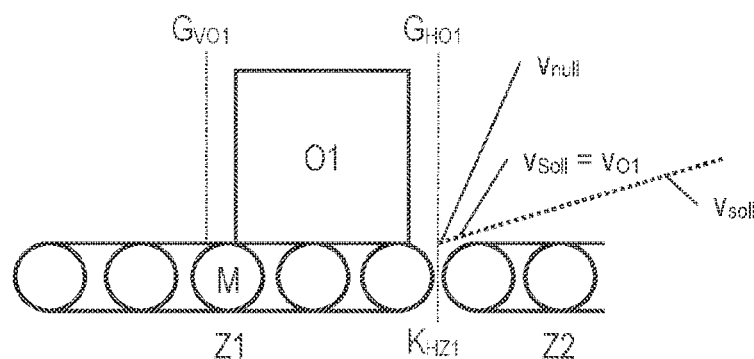
FIG. 15 shows a detail view of FIG. 14.

FIGS. 14 and 15 show an example in this regard, which is, in turn, based on the case shown in FIGS. 6 and 7. For the second object O2, the controller 5 again calculates a continuous course of a speed reduction of a target speed $v_{soll}$, wherein the calculated stop position $P_{Stop}$ of the virtual object front edge $G_{VO2}$ of the second object O2 lies at the position of the virtual object rear edge $G_{HO1}$ of the first stopped object O1. Hence, the calculated stop position $P_{Stop}$ of the second physical object front edge $K_{VO2}$ of the second object O2, at which $v_{soll}=0$ applies to the target speed, is now actually located in front of the physical object rear edge $K_{HO1}$ of the stopped first object O1. This means that although, in terms of control technology, there is a situation according to FIGS. 6 and 7, actually, a situation according to FIG. 15 is given. By the suggested measures, a lower-pressure accumulation of objects O1, O2 and/or a lower-pressure formation of object blocks is possible. Thus, the suggested approach is particularly suitable for sensitive objects O1, O2, such as for example for containers with fragile goods or for containers, which are easily deformable, such as flexible bags (polybags).

In the examples described in FIGS. 12 to 15 described, the first object O1 is stopped with its virtual object rear edge $G_{HO1}$ and the second object O2 is stopped with its virtual object front edge $G_{VO2}$ at an upstream zone rear edge $K_{HZ1}$ of the first zone Z1. However, this is not an obligatory condition for the described method. It would also be conceivable that the first object O1 is still stopped with its physical object rear edge $K_{HO1}$ and the second object O2 is stopped with its physical object front edge $K_{VO2}$ at an upstream zone rear edge $K_{HZ1}$ of the first zone Z1. In this case, the virtual object rear edge $G_{HO1}$ of the first object O1 and the virtual object front edge $G_{VO2}$ of the second object O2 are taken as a basis merely for the calculation of the speed reduction of the second object O2.

For the sake of completeness, it should be noted that the different method variants described in FIGS. 5 to 15 do not preclude one another. For example, it would be conceivable that the conveying device 1 is differently operated at different times. For example, in a first operating mode, a method according to FIGS. 5 to 7 and, in a second operating mode, a method according to FIGS. 8 and 9 may be applied. In particular, it is also conceivable that different objects O1, O2 are virtually changed in different ways. For example, a first object O2 may remain unchanged in terms of control technology (i.e. not be virtually elongated or shortened), whereas a second object O2 may be virtually elongated in terms of control technology and a third object may be virtually shortened in terms of control technology. Advantageously, particularly sensitive objects O1, O2 are virtually elongated, particularly robust objects O1, O2 are virtually shortened, and normally sensitive objects O1, O2 remain unchanged in terms of control technology.

It is particularly advantageous if the distance between the virtual object rear edge $G_{HO1}$ and the physical object rear edge $K_{HO1}$ of the first object O1 and/or the distance between the virtual object front edge $G_{VO2}$ and the physical object front edge $K_{VO2}$ of the second object O2 corresponds to the inaccuracy in the position determination of the first object O1 and the second object O2 by the measuring device L1 plus a tolerance of ±10%. In cases a) and b) and/or in the case shown in FIGS. 12 and 13, hence, distanceless accumulation is ensured only just and at minimum pressure. A (physical) distance between objects O1, O2 due to measuring inaccuracies may thus be precluded. In cases c) and d) and/or in the case shown in FIGS. 14 and 15, in contrast, pressureless accumulation at a minimum distance is ensured by the suggested measures. In general, the calculation of the speed reduction may be based on a virtual length of an object O1, O2 whose difference from the physical length of this object O1, O2 corresponds to twice the inaccuracy in the position determination of the first object O1 and the second object O2 by the first measuring device plus a tolerance of ±10%. In cases a) and b), the virtual length is smaller than the physical length of an object O1, O2, in cases c) and d), in contrast, it is larger. Hence, in cases a) and b), a distanceless accumulation at minimum pressure and in cases c) and d), a pressureless accumulation at minimum distance may be ensured.

The inevitable measuring tolerances in the determination of the object rear edge $K_{HO1}$ of the first object O1 and the object front edge $K_{VO2}$ of the second object O2 as well as inaccuracies in the calculation of the position of the object rear edge $K_{HO1}$ of the first object O1 and the object front edge $K_{VO2}$ of the second object O2 do not only result in the already mentioned problems but also in that the actual position of an object O1, O2 when leaving the accumulation area SB is not precisely known. So as to be able to carry out a correction in terms of control technology, the second light barrier L2 arranged at the downstream end of the accumulation area SB is used. For this purpose, a current position of an object O1, O2 determined with aid of the rotation signals from the drives M of the conveyor rollers $2_M$, $2_L$ is reset to the value of the second measuring position $P_{Mess2}$ when the respective object O1, O2 is detected at the second measuring position $P_{Mess2}$. Thus, the position of an object O1, O2 present in the controller 5 then again corresponds to the actual position of the respective object O1, O2. This measure is not limit to the second measuring position $P_{Mess2}$, but multiple further measuring positions and/or measuring devices may be provided in the course of the conveying device 1 so as to more often align the position of an object O1, O2 present in the controller 5 with the actual position of the respective object O1, O2, and/or to prevent measurement-related errors from becoming too large.

At this point, it should also be noted that it is not obligatorily required for a measuring device L1, L2 to be provided at each measuring position $P_{Mess1}$, $P_{Mess2}$. Instead, a measuring device L1, L2 may optionally also detect multiple measuring positions $P_{Mess1}$, $P_{Mess2}$. This is possible particularly where the measuring device L1, L2 is designed as a camera or laser scanner.

In summary, the suggested method for accumulating objects O1, O2 in the accumulation area SB of the conveying device 1 in the form of object blocks comprises the following steps:
  detecting the object rear edge $K_{HO1}$ of the first object O1 at the first measuring position $P_{Mess1}$ by means of the first measuring device L1, wherein the first object O1 is moved past the first measuring position $P_{Mess1}$ downstream in the conveying direction by the driven conveyor elements 2, $2_M$, $2_L$,
  detecting the object front edge $K_{VO2}$ of the second object O2, which follows the first object O2 upstream, at the first measuring position $P_{Mess1}$ by means of the first measuring device L1, wherein the second object O2 is moved past the first measuring position $P_{Mess1}$ downstream in the conveying direction by the driven conveyor elements 2, $2_M$, $2_L$,
  moving the first object O1 to the stop position $P_{Stop}$, which is located downstream of the first measuring position $P_{Mess1}$ in the conveying direction, and stopping the first object O1 with its object rear edge $K_{HO1}$ at its stop position $P_{Stop}$ with the aid of the conveyor elements 2, $2_M$, $2_L$,
  calculating a continuous curve of a speed reduction of a target speed $v_{Soll}$ for the second object O2 by the controller 5, wherein the calculated stop position $P_{Stop}$ of the object front edge $K_{VO2}$ of the second object O2 is located at the position of the object rear edge $K_{HO1}$ of the stopped first object O1, or between the object front edge $K_{VO1}$ and the object rear edge $K_{HO1}$ of the stopped first object O1, and
  moving and stopping the second object O2 with the aid of the conveyor elements 2, $2_M$, $2_L$ using the calculated speed reduction.

Below, some strategies for forming object blocks will be elucidated based on the already described conveying device 1. In this regard, the zones Za . . . Zg, in terms of their structure, correspond to the zones Z1 . . . Z7 disclosed in FIGS. 5 to 15 and may thus again be driven independently.

In a first example, the formation of an object block starting out from the upstream end of the accumulation area SB is elucidated.

Figure 16:
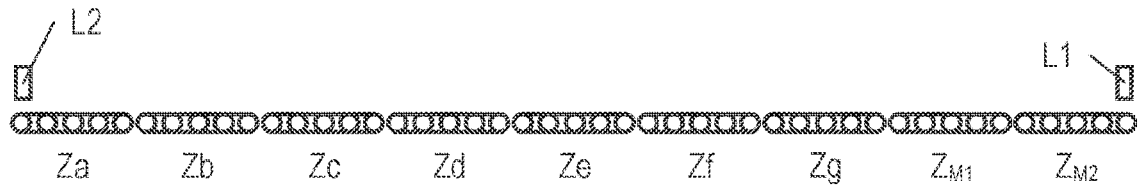
FIGS. 16 to 24 show a conveying device at different points in time of an exemplary course of method for forming an object block at the upstream end of the accumulation area.
Figure 18:
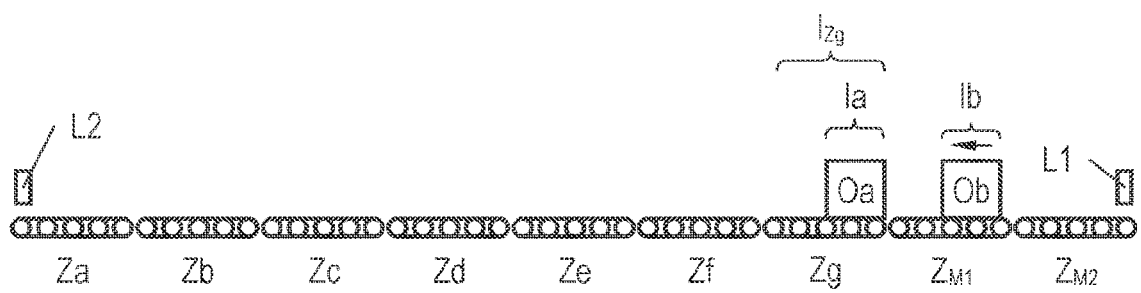
Figure 19:
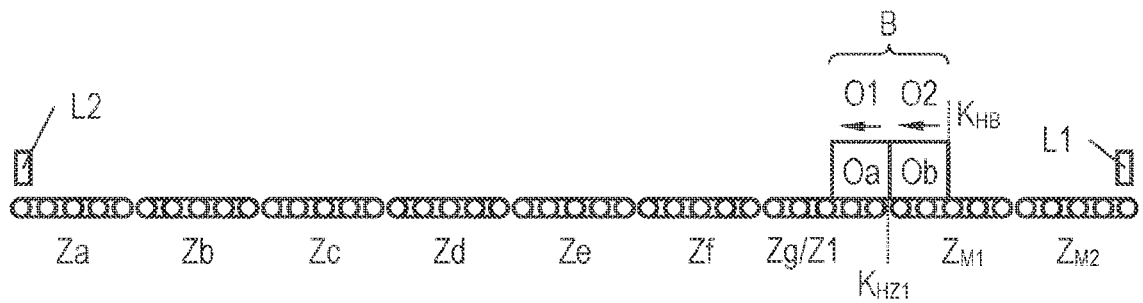

For this purpose, FIG. 16 shows the conveying device 1 at a first point in time, at which there is no object in the accumulation area SB yet. At a further point in time shown in FIG. 17, an object Oa is moved through the measuring area MB. At a point in time shown in FIG. 18, the object Oa has stopped at the zone rear edge of zone Zg located upstream. Additionally, an object Ob is moved through the measuring area MB. At a point in time shown in FIG. 19, the object Ob has reached the object Oa. At this point in time, a first object O1 forms the object Oa and a second object O2 forms the object Ob. Moreover, at this point in time, the zone Zg forms a first zone Z1.

Figure 20:
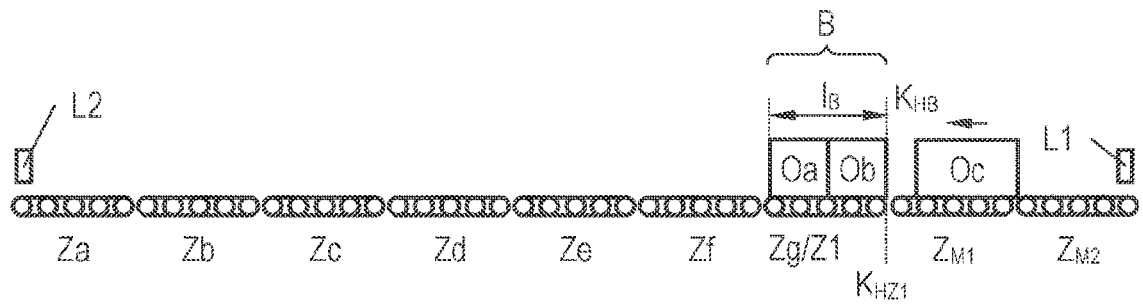

The two objects Oa/O1 and Ob/O2 now become part of an object block B, which is moved downstream in the conveying direction with the aid of the conveyor rollers 2, $2_M$, $2_L$ at a common actual speed. The object block B is stopped with the aid of the conveyor rollers 2, $2_M$, $2_L$ when it reaches the zone rear edge $K_{HZ1}$ of the first zone Z1 with its block rear edge $K_{HB}$. This state is depicted in FIG. 20. Additionally, at this point in time, an object Oc moves towards the object block B.

By way of example, the block length $l_B$ of the object block B is indicated in FIG. 20. The block length $l_B$ of the object block B corresponds to the sum of the lengths $l_a + l_b$ of the objects Oa and Ob and is smaller than or equal to the length $lz_g$ of the zone Zg/Z1 (also see FIG. 18).

Figure 21:
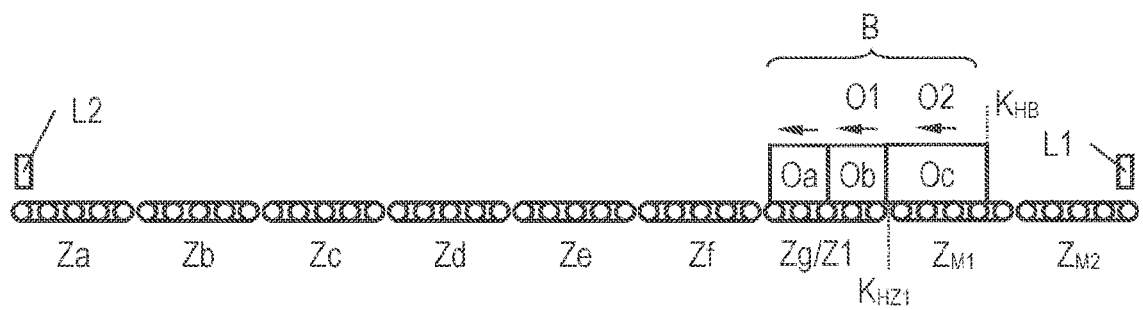

At a point in time shown in FIG. 21, the object Oc has reached the object block B. Now, the object Ob forms a first object O1 and the object Oc forms a second object O2. At this point in time, the zone Zg, in turn, forms a first zone Z1.

Figure 22:
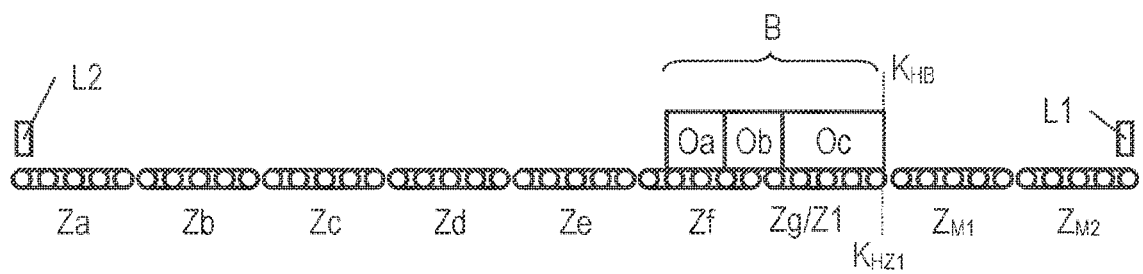

The object Oc/O2 now also becomes part of the object block B, which is moved downstream in the conveying direction with the aid of the conveyor rollers 2, $2_M$, $2_L$ at a common actual speed. The object block B is stopped with the aid of the conveyor rollers 2, $2_M$, $2_L$ when it reaches the zone rear edge $K_{HZ1}$ of the first zone Z1 with its block rear edge $K_{HB}$. This state is depicted in FIG. 22.

Figure 23:
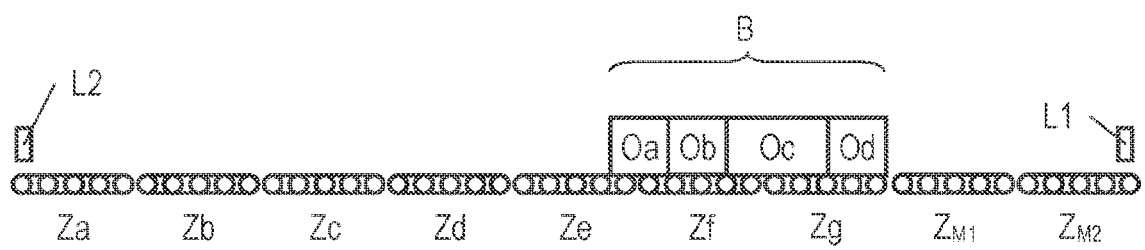
Figure 24:
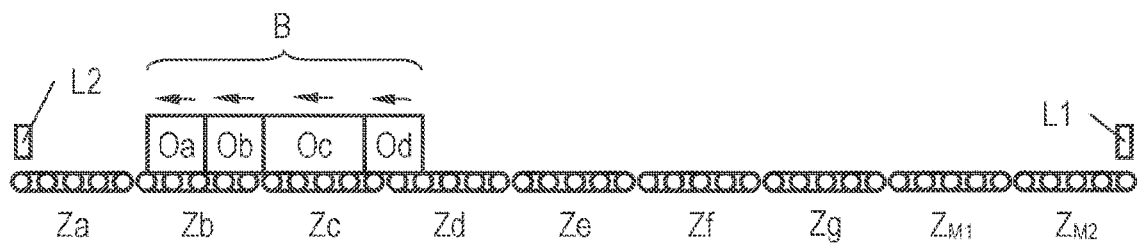

At the point in time shown in FIG. 23, a further object Od has been added to the object block B in the already described manner. The described procedure may thus be recursively repeated for a desired number of objects Oa . . . Od, whereby object blocks B of any desired length may be created. At a point in time shown in FIG. 24, the object block B is lastly transported out of the accumulation area SB and is passed on to a following conveyor, which is not shown, at the exit A.

In a further example, a variant in the formation of an object block B starting out from the upstream end of the accumulation area B is elucidated. Here, again, an empty conveying device 1 is taken as the starting point (cf. FIG. 16).

Figure 25:
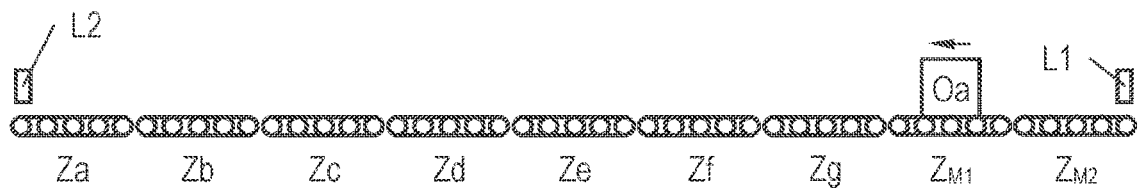
FIGS. 25 to 39 show a variant of a course of method described in FIGS. 16 to 24 in which an object is positioned isolated at the downstream end of the accumulation area.
Figure 26:

At a point in time shown in FIG. 25, again, an object Oa is moved through the measuring area MB. This state corresponds to the state shown in FIG. 17. At a point in time shown in FIG. 26, the object Oa has reached the zone rear edge of zone Zg located upstream. However, in this example, the object Oa is not stopped, as in FIG. 18, but moved further.

Figure 27:
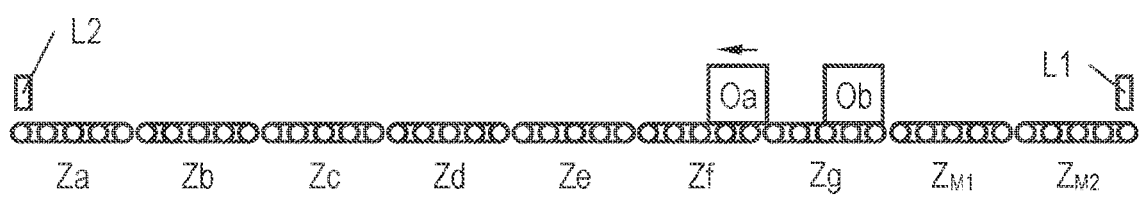
Figure 28:
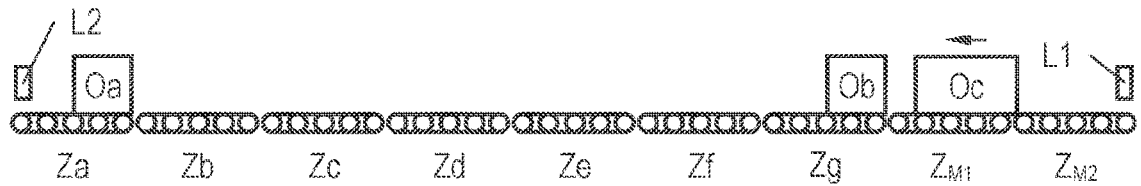

At a point in time shown in FIG. 27, however, the object Ob has reached the zone rear edge of zone Zg located upstream and is stopped there. The object Oa is moved further downstream. Lastly, the object Oa is stopped at the zone rear edge of the zone ZA located upstream. This state is depicted in FIG. 28. Additionally, at this point in time, an object Oc moves towards the object Ob.

Figure 29:
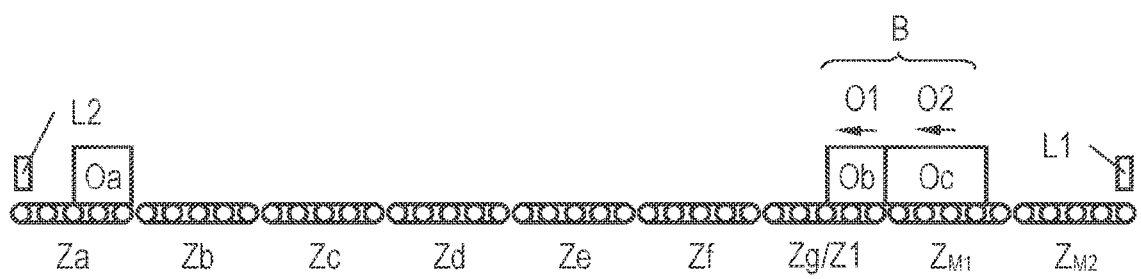

At a point in time shown in FIG. 29, the object Oc has reached the object Ob. At this point in time, the object Ob, in turn, forms a first object O1 and the object Oc forms a second object O2. At this point in time, the zone Zg, in turn, forms a first zone Z1.

Figure 30:
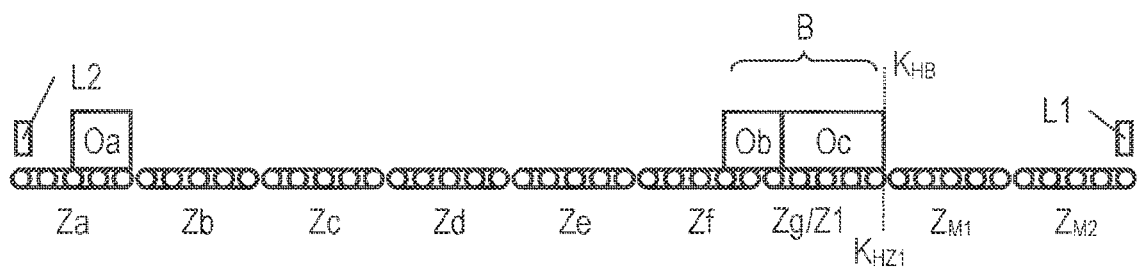

The two objects Ob/O1 and Oc/O2 now become part of an object block B, which is moved downstream in the conveying direction with the aid of the conveyor rollers $2, 2_M, 2_L$ at a common actual speed. The object block B is stopped with the aid of the conveyor rollers $2, 2_M, 2_L$ when it reaches the zone rear edge $K_{HZ1}$ of the first zone Zg/Z1 with its block rear edge $K_{HB}$. This state is depicted in FIG. 30.

Figure 31:
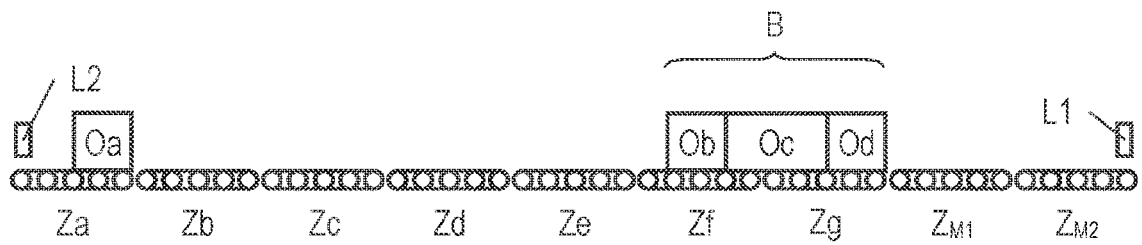

At the point in time shown in FIG. 31, an object Od has been added to the object block B in the already described manner. At a point in time shown in FIG. 32, the object Oa is transported out of the accumulation area SB and is passed on to a following conveyor, which is not shown, at the exit A.

Here, the advantage of the suggested method may well be seen. By the isolation of the object Oa leading in the accumulation area SB from the rest of the objects Ob . . . Od located in the accumulation area SB, it may quickly be transported out of the accumulation area SB upon a corresponding request. This is as opposed to a solution in which the object Oa leading in the accumulation area SB is part of an object block B which has been formed in the upstream part of the accumulation area SB (cf. FIG. 23 in this regard).

In an advantageous variant of the suggested method, now, an object Ob following the (originally) leading object Oa is detached from the object block B and transported to the downstream end of the accumulation area SB after the object Oa has left the accumulation area SB. For this purpose, the following possibilities are conceivable:

For example, it can be awaited that a following object Oe allows for the isolation of the leading object Ob. This possibility is shown in FIGS. 33 to 39.

Figure 33:
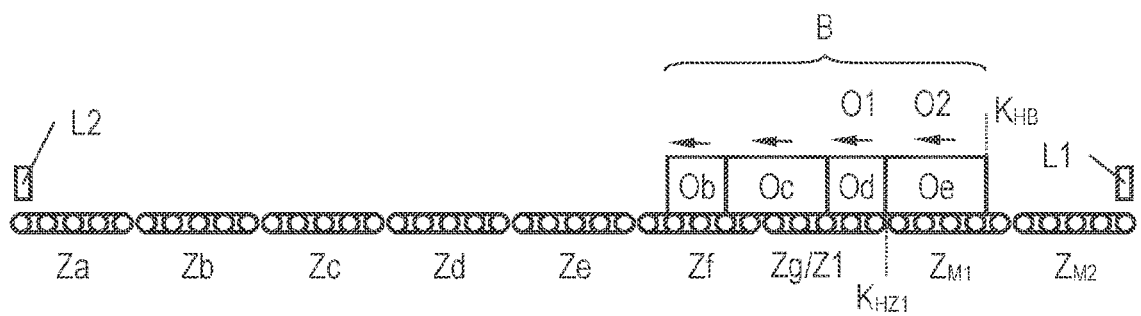

At a point in time shown in FIG. 33, the object Oe has reached the object Od. At this point in time, the object Od, in turn, forms a first object O1 and the object Oe forms a second object O2. At this point in time, the zone Zg, in turn, forms a first zone Z1.

Figure 34:
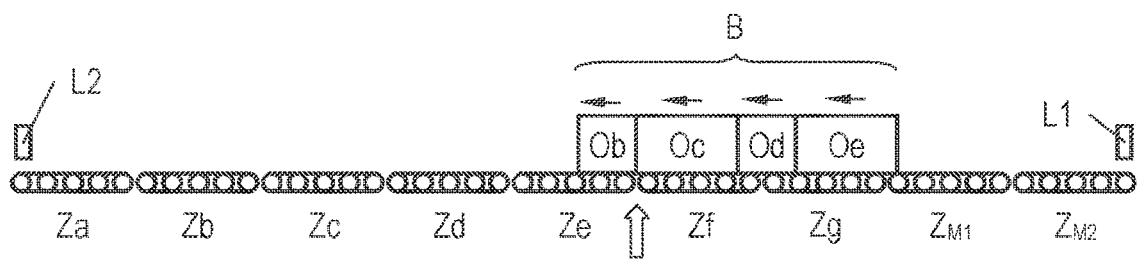
Figure 35:
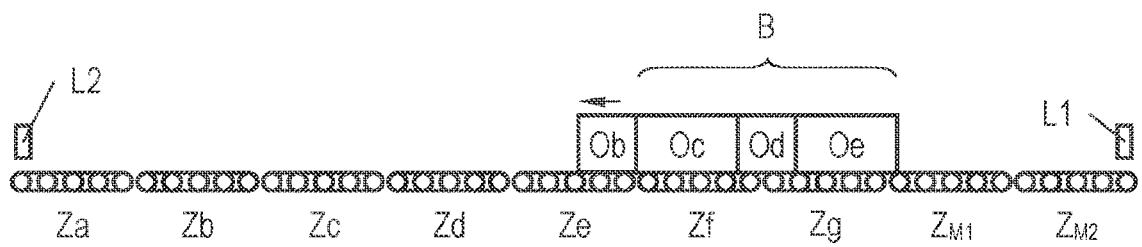

The object Oe subsequently becomes part of the object block B, which is moved downstream in the conveying direction with the aid of the conveyor rollers $2, 2_M, 2_L$ at a common actual speed. However, the object block B is now stopped with the aid of the conveyor rollers $2, 2_M, 2_L$ not only when it reaches the zone rear edge $K_{HZ1}$ of the first zone Z1 with its block rear edge $K_{HB}$, but when the object Ob reaches the zone rear edge of the zone Ze marked with the arrow with its object rear edge. This state is depicted in FIG. 34. At this point, the object block B is divided by the object Ob being moved further while the objects Oc . . . Oe remain still. This state is depicted in FIG. 35.

Figure 36:
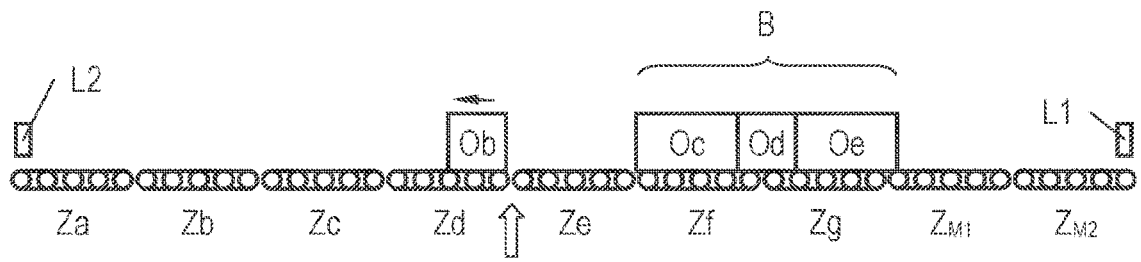
Figure 37:
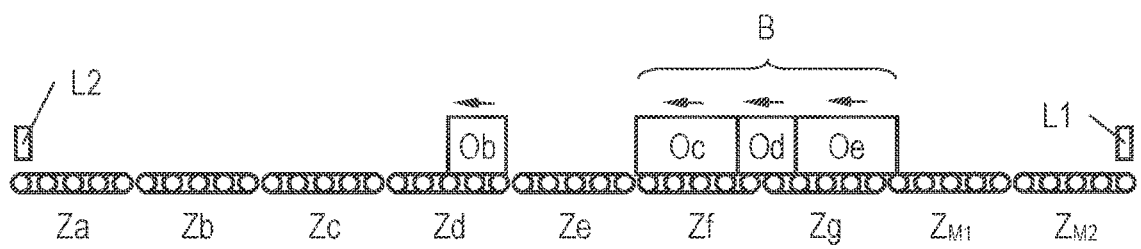
Figure 38:
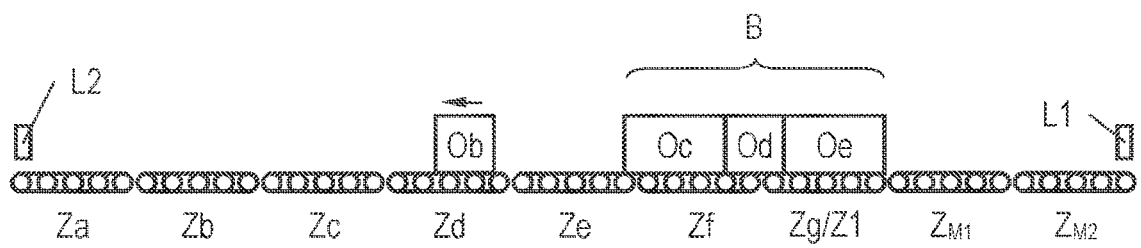
Figure 39:
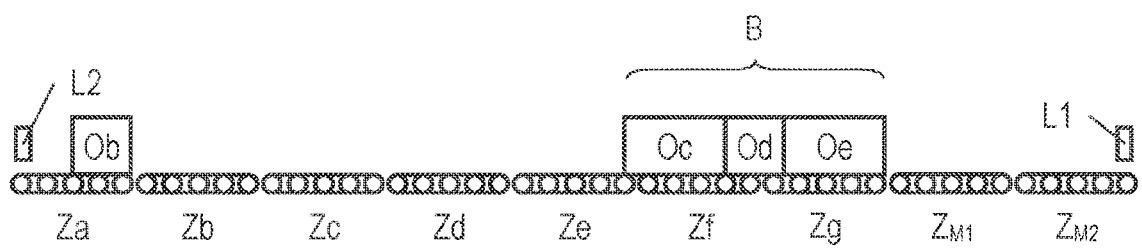

At a point in time shown in FIG. 36, the object Ob has reached the zone rear edge of zone Zd, marked with an arrow, with its object rear edge. At this point in time, the object Ob and the object block B may be moved independently of one another. The object block B is thus set into motion at a point in time shown in FIG. 37 and advances to the zone rear edge of the zone Zg. At a point in time shown in FIG. 38, the object block B has reached the zone rear edge $K_{HZ1}$ of the first zone Zg/Z1 and is stopped there. The object Ob, in contrast, moves further downstream. At a point in time shown in FIG. 39, the object Ob has reached the zone Za and is stopped there. Thus, upon a corresponding request, it can quickly be conveyed to the exit A of the accumulation area SB.

Figure 32:
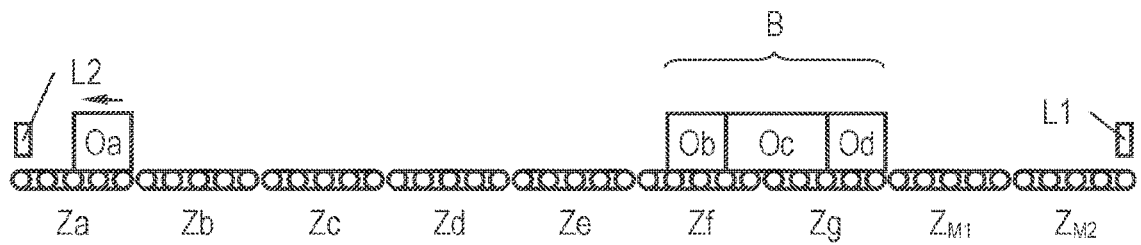
Figure 40:
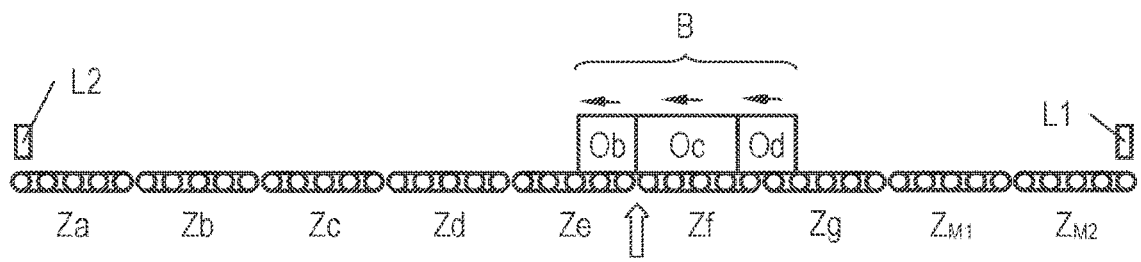
FIGS. 40 to 41 show another variant of the course of method described in FIGS. 25 to 39 for isolating an object from an object block.
Figure 41:
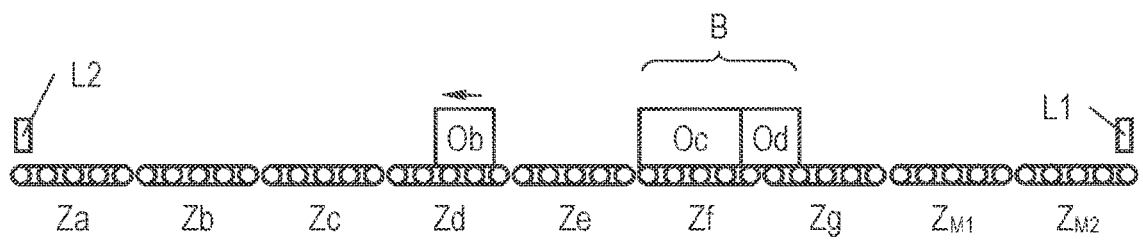

Another possibility of isolating the object Ob is shown in FIGS. 40 to 41, wherein FIG. 40 follows FIG. 32 in the course of the method. In this variant, the object block B, irrespective of whether an object Oe follows or not, is moved downstream until, in turn, the object Ob reaches the zone rear edge of the zone Ze marked with an arrow with its object rear edge. This state is depicted in FIG. 40. At this point in time, the object block B is divided by the object Ob being moved further while the objects Oc, Od, in contrast, remain still. This state is depicted in FIG. 41. The object Ob subsequently again advances into zone Za and is stopped there. Thus, upon a corresponding request, it can quickly be conveyed to the exit A of the accumulation area SB. However, the object block B stays at the position shown in FIG. 41 until a request is made for the object Oc to be isolated from the object block B.

The situation shown in FIG. 41 offers the advantage that the object Oc may quickly be isolated from the object block B, however, entails the disadvantage that no further object Oe may be added to the object block B, since the object block B begins not at the zone rear edge of zone Zg but at the zone front edge of zone Zf.

Figure 42:
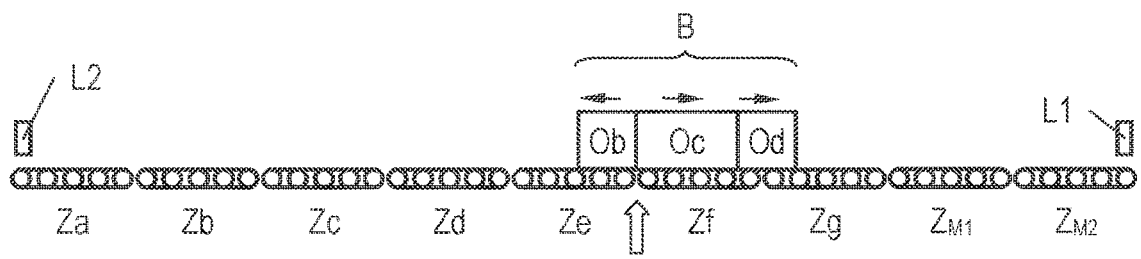
FIGS. 42 to 43 show a further variant for isolating an object from an object block.
Figure 43:
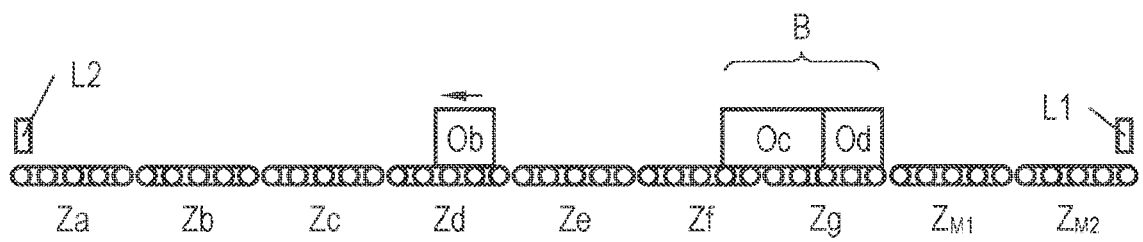
Figure 44:
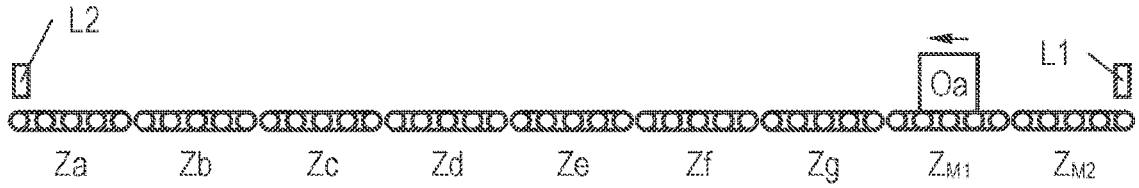
FIGS. 44 to 50 show a conveying device at different points in time of an exemplary course of method for forming an object block at the downstream end of the accumulation area.

In order to allow for an enlargement of the object block B even after the object Ob is isolated, a further variant shown in FIGS. 42 to 43 provides that the objects Oc, Od are moved upstream after the separation from object Ob. This state is depicted in FIG. 42. Subsequently, the object block consisting of the objects Oc, Od is moved back to the zone rear edge of zone Zg and is stopped there. The object Ob, in contrast, is moved further downstream. This state is depicted in FIG. 43. The object Ob again advances into zone Za and is stopped there. Thus, upon a corresponding request, it can quickly be conveyed to the exit A of the accumulation area SB. However, the object block B is now situated with its block rear edge at the zone rear edge of zone Zg, so that a following object Oe can be added to the object block B.

In an example shown in FIGS. 44 to 55, a slightly different course of the method is visualized.

Figure 17:
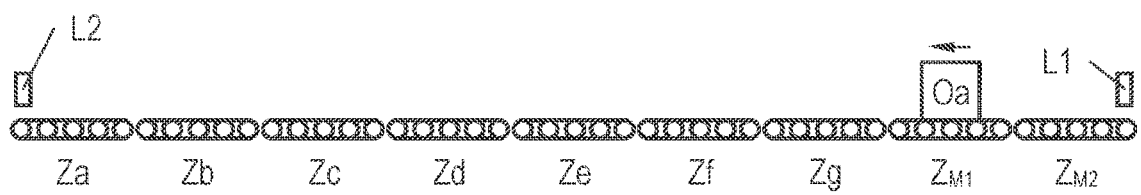
Figure 45:
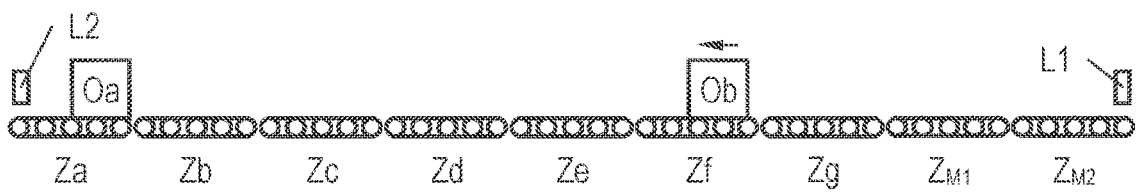

At a point in time shown in FIG. 44, again, an object Oa is moved through the measuring area MB (also cf. FIG. 17). Now however, the object Oa does not stop at the zone rear edge of zone Zg but advances into zone Za and is stopped at the zone rear edge of zone Za. This state is depicted in FIG. 45. Additionally, an object Ob is moved over the conveying device 1 at the point in time shown in FIG. 45.

Figure 46:
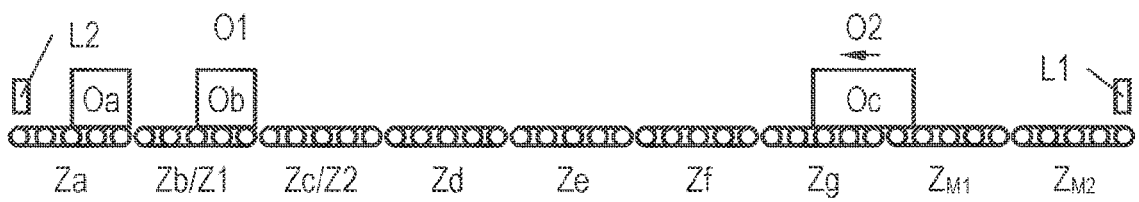

At a point in time shown in FIG. 46, the object Ob was stopped with its object rear edge at the zone rear edge of zone Zb. Additionally, an object Oc is moved over the conveying device 1. At a point in time shown in FIG. 46, the object Ob forms a first object O1, the object Oc forms a second object O2. Moreover, at this point in time, the zone Zb forms a first zone Z1, zone Zc forms a second zone Z2.

Figure 47:
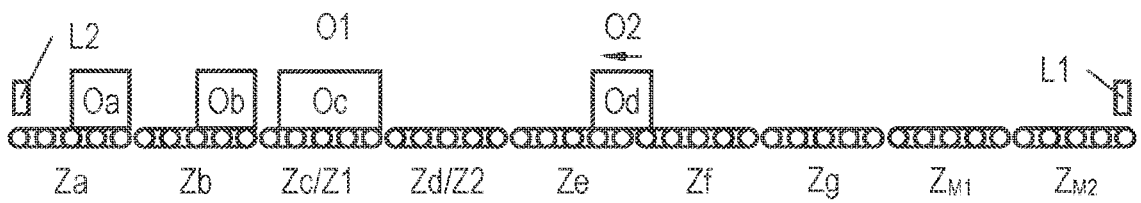

A check whether the group of the successive objects Ob/O1 and Oc/O2 fits into a zone Zb/Z1, Zc/Z2 or into a group of successive zones Zb/Z1, Zc/Z2, has a negative result as the total length of the objects Ob/O1 and Oc/O2 exceeds the total length of the zones Zb/Z1, Zc/Z2. The second object Oc/O2 is therefore stopped with its object rear edge at the zone rear edge of the second zone Zc/Z2 of the accumulation area SB. This state is depicted in FIG. 47. Additionally, an object Od is moved over the conveying device 1 at that point in time.

At the point in time shown in FIG. 47, the object Oc forms a first object O1, the object Od forms a second object O2. Moreover, at this point in time, the zone Zc forms a first zone Z1, the zone Zd forms a second zone. A check whether a group of successive objects Ob . . . Od, including the first object Oc/O1 and the second object Od/O2, fits into a zone Zb, Zc or into a group of successive zones Zb, Zc, has a positive result as the total length of the objects Ob . . . Od is smaller than the total length of the zones Zb, Zc. Therefore, an object block B is subsequently formed from the objects Ob . . . Od of the group.

Figure 48:
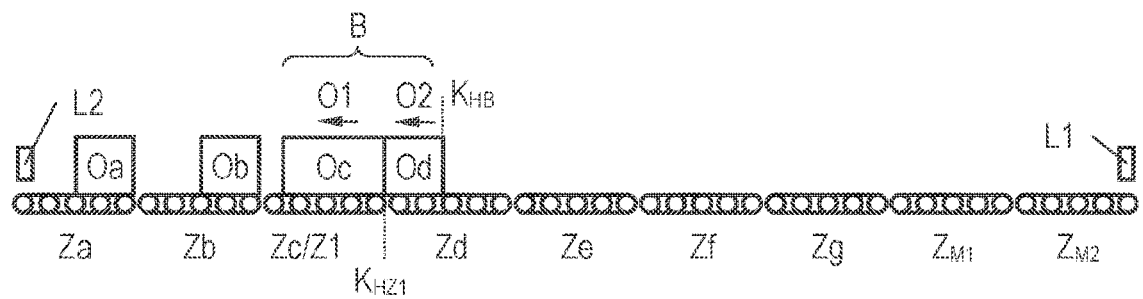

At a point in time shown in FIG. 48, the object Od has reached the object Oc. At this point in time, the object Oc still forms the first object O1, the object Od forms the second object O2. At this point in time, the zone Zc still forms the first zone Z1. The two objects Oc/O1 and Od/O2 now become part of an object block B, which is moved downstream in the conveying direction with the aid of the conveyor rollers 2, $2_M$, $2_L$ at a common actual speed.

Figure 49:
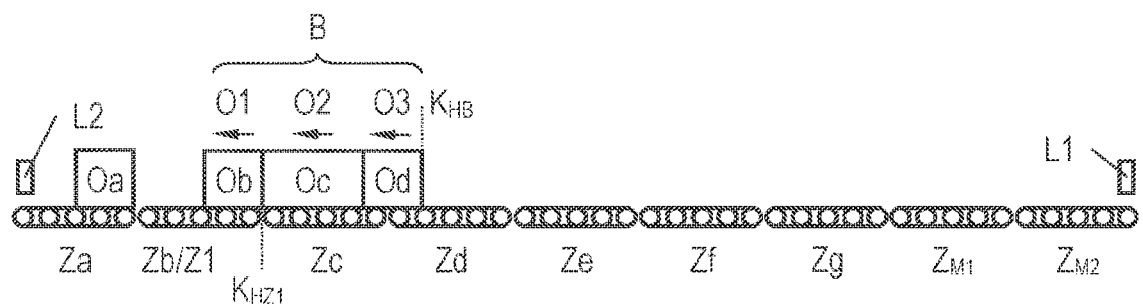

At a point in time shown in FIG. 49, the object block B meets the object Ob. Now, the object Ob forms a first object O1 and the object Oc forms a second object O2. Moreover, at this point in time, the zone Zb forms a first zone Z1. The object Ob now becomes part of the object block B, which is moved downstream in the conveying direction with the aid of the conveyor rollers 2, $2_M$, $2_L$ at a common actual speed.

Figure 50:
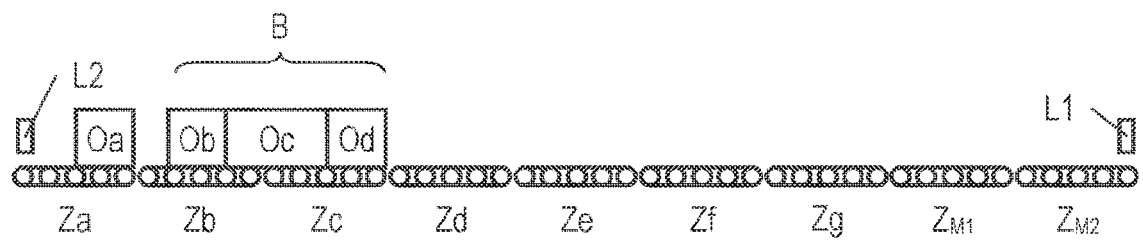
Figure 51:
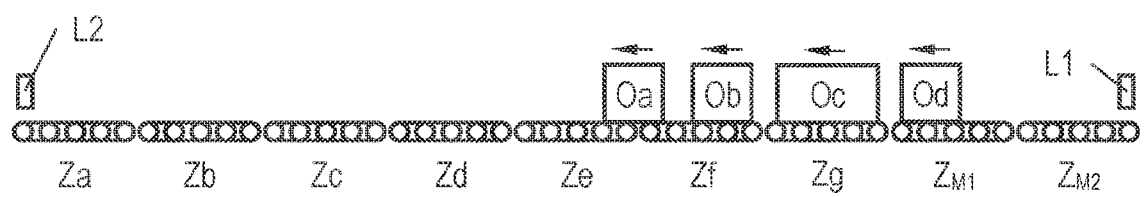
FIGS. 51 to 55 are similar as the course of method described in FIGS. 44 to 50, but with objects following each other closely at the entry to the accumulation area.

The object block B is stopped with the aid of the conveyor rollers 2, $2_M$, $2_L$ when it reaches the zone rear edge of the zone Zc following downstream with its block rear edge $K_{HB}$. This state is depicted in FIG. 50. In this regard, the block rear edge $K_{HB}$ corresponds to the object rear edge of a third object O3, which is formed by the object Od.

The example shown in FIGS. 51 to 55 proceeds very similarly to the example shown in FIGS. 44 to 55. As opposed to this however, the objects Oa . . . Od follow at a short distance from each other at the entry E to the accumulation area SB. At the point in time shown in FIG. 51, the objects Oa . . . Od move synchronously in the region of zones Ze . . . $Z_{M1}$. In contrast to the example shown in FIGS. 44 to 55, the check whether a group of successive objects Oa . . . Od fits into a zone Zb, Zc or into a group of successive zones Zb, Zc, is already possible at this point in time as all objects Oa . . . Od have already passed the light barrier L1.

Figure 52:
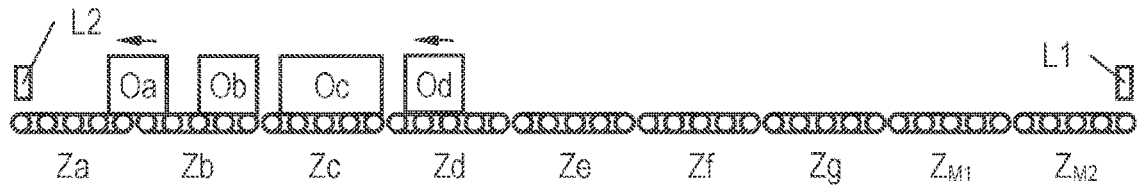
Figure 53:
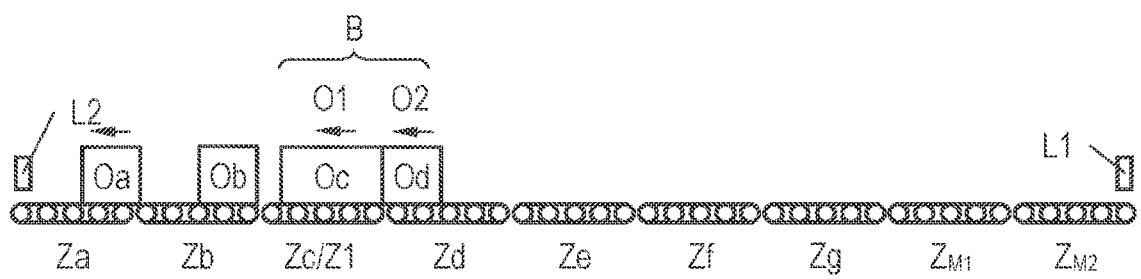
Figure 54:
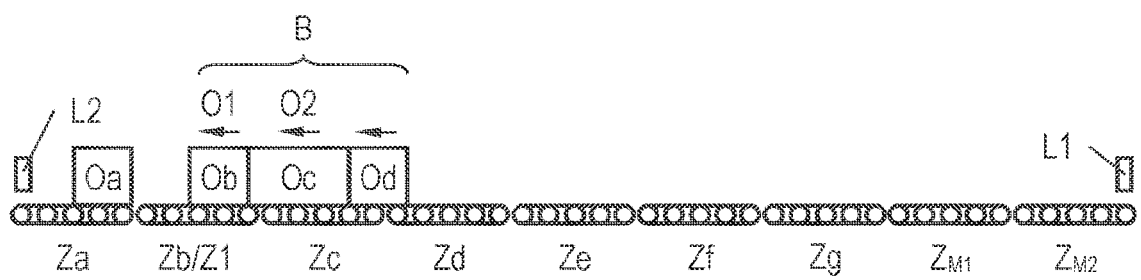

At a point in time shown in FIG. 52, the objects Ob, Oc are stopped in the successive zones Zb, Zc. The objects Oa and Od, however, are moved further. At a point in time shown in FIG. 53, the object Od has reached the object Oc. Therefore, a formation of an object block B in the manner already described for FIG. 48 follows. The object Ob has temporarily stopped in zone Zb. At a point in time shown in FIG. 54, the object blocks B has reached the stopped object Ob. Therefore, an enlargement of the object block B in the manner already described for FIG. 49 follows. In FIG. 54, the object Oa has temporarily stopped in zone Za. At a point in time shown in FIG. 55, the object block B has stopped with its block rear edge at the zone rear edge of zone Zc. This state corresponds to the state shown in FIG. 50.

The example shown in FIGS. 56 to 61 proceeds very similarly to the example shown in FIGS. 51 to 55. As opposed to this, the object block B is now not formed starting from the upstream end but starting from the downstream end.

Figure 55:
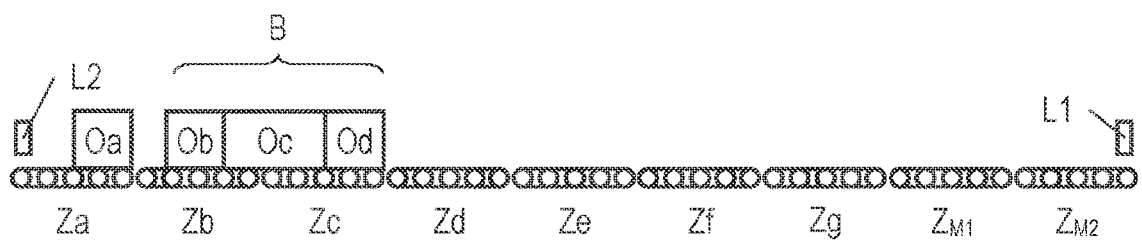
Figure 56:
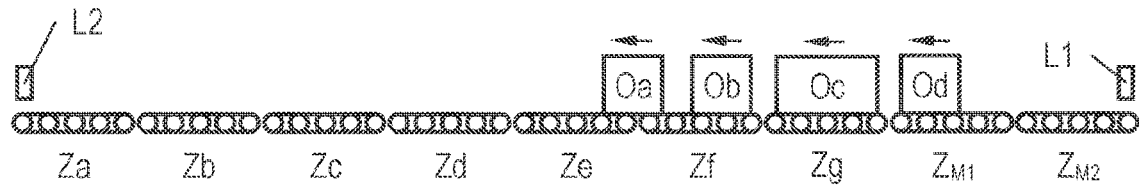
FIGS. 56 to 61 are similar to the course of method described in FIGS. 51 to 55, but with the formation of an object block starting downstream.
Figure 57:
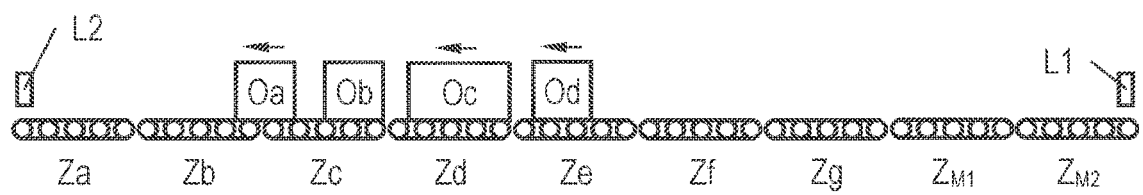

At the point in time shown in FIG. 56, the objects Oa . . . Od move synchronously in the region of zones Ze . . . $Z_{M1}$ (also cf. FIG. 51). In contrast to the example shown in FIGS. 51 to 55, the object Ob already stops in zone Zc, while the remaining objects Oa, Oc and Od move further downstream (see the difference from the state shown in FIG. 52).

Figure 58:
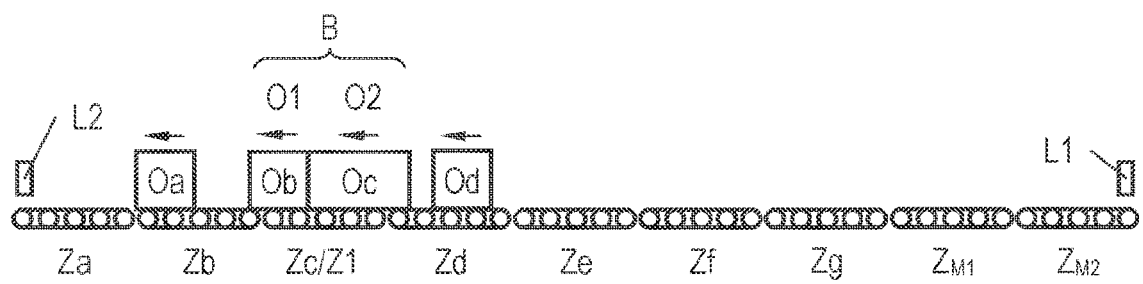
Figure 59:
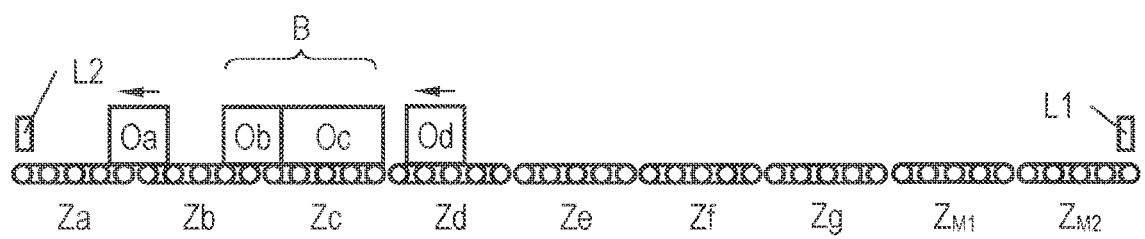
Figure 60:
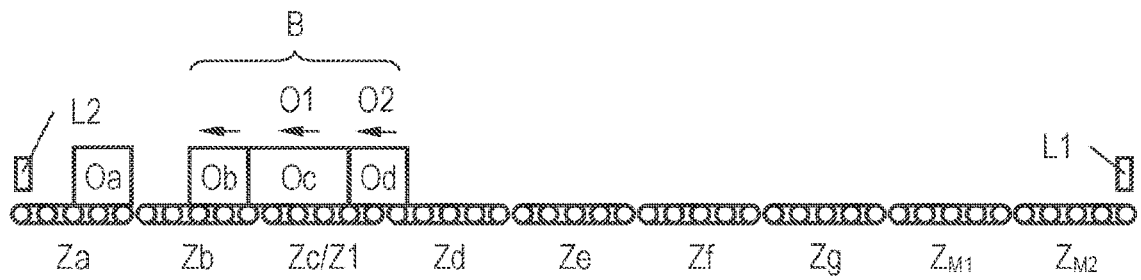

At a point in time shown in FIG. 58, the object Oc has reached the object Ob. Therefore, a formation of an object block B in the manner already described follows. The objects Oa and Od, however, are moved further downstream. At a point in time shown in FIG. 59, the object block B has stopped with its block rear edge at the zone rear edge of zone Zc. The objects Oa and Od, however, are moved further downstream. At a point in time shown in FIG. 60, the object Od has reached the stopped object Oc. Therefore, an enlargement of the object block B in the manner already described follows. In FIG. 60, the object Oa has temporarily stopped in zone Za. At a point in time shown in FIG. 61, the object block B has stopped with its block rear edge at the zone rear edge of zone Zc. This state corresponds to the state shown in FIG. 55.

Figure 61:
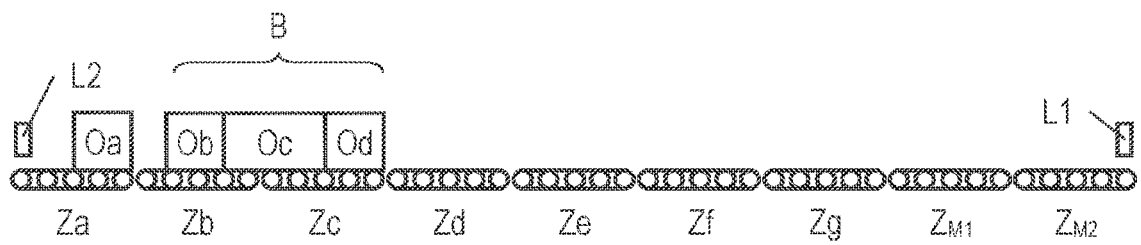

FIGS. 62 to 70 show a further possible course of the method starting from the state shown in FIG. 50, 55 or 61.

Figure 62:
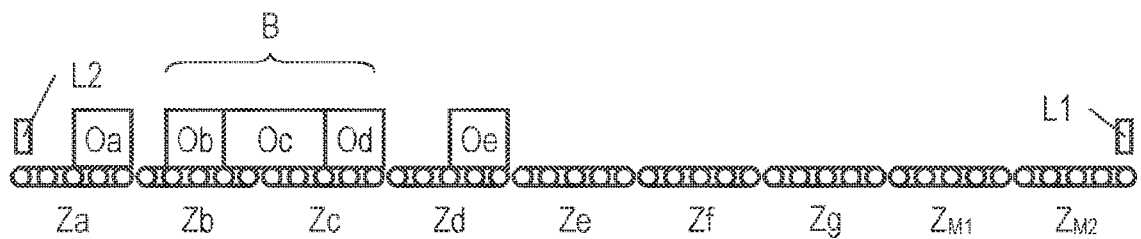
FIGS. 62 to 70 show an exemplary course of method for isolating an object from an object block starting from the situation shown in FIG. 50, 55 or 61.
Figure 63:
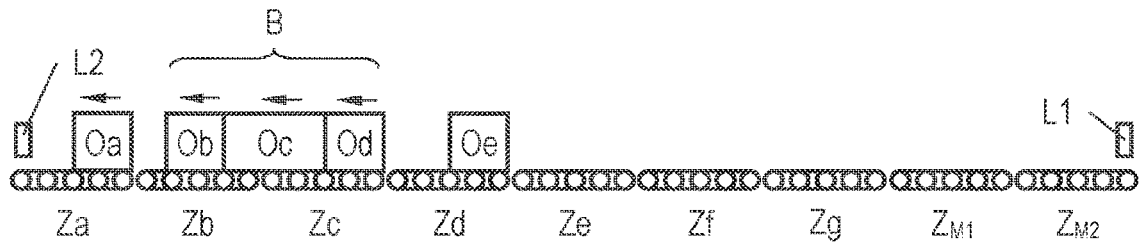

At a point in time shown in FIG. 62, an object Oe has stopped at the zone rear edge of zone Zd. Due to a request to transport the object Oa out of the accumulation area SB, the object Oa is set into motion, as is shown in FIG. 63. Additionally, the object block B is set into motion in order to allow for an isolation of the object Ob from the object block B.

Figure 64:
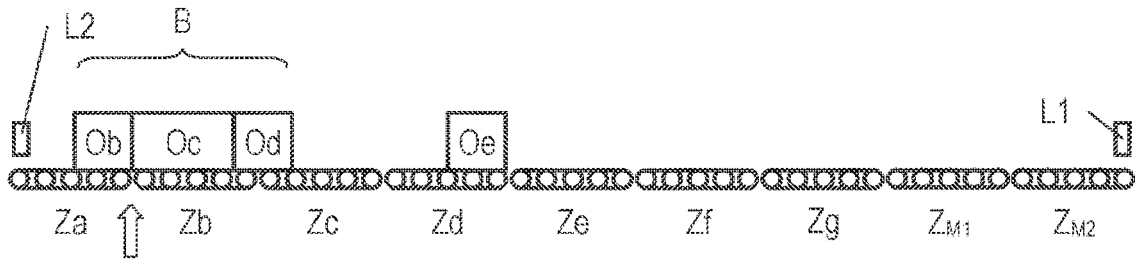

Subsequently, the object block B is moved downstream until the object Ob has reached the zone rear edge of zone Za marked with the arrow with its object rear edge. This state is depicted in FIG. 64. In general, the objects Ob . . . Od can now be stopped and remain still in such a way, until a request to transport the object Ob out of the accumulation area SB is received. Subsequently, the object Oc can be isolated from the object block B in the same manner, and so on. The indicated method may thus be carried out recursively any number of times.

Figure 65:
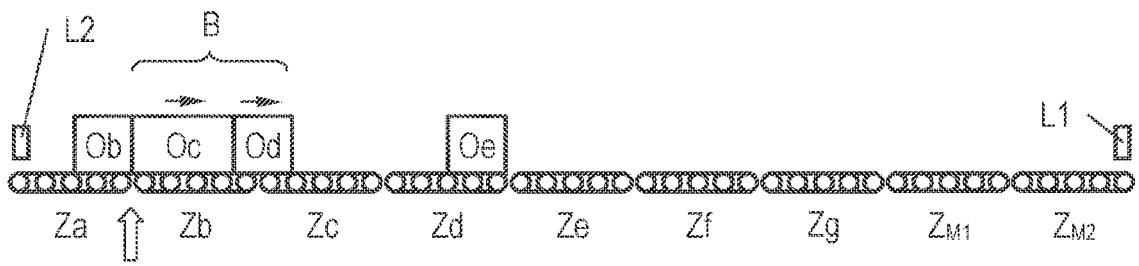
Figure 66:
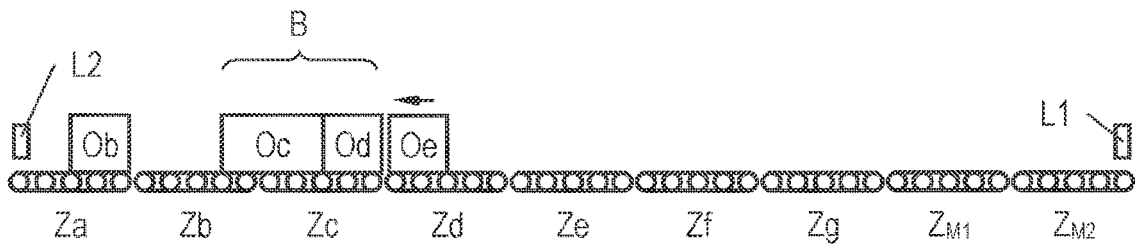

However, it would also be conceivable that the objects Oc and Od are moved upstream, as is shown in FIG. 65. At a point in time shown in FIG. 66, the object block B consisting of the objects Oc, Od was stopped at the zone rear edge of zone Zc. Additionally, a following object Oe is moved towards the object block.

Figure 67:
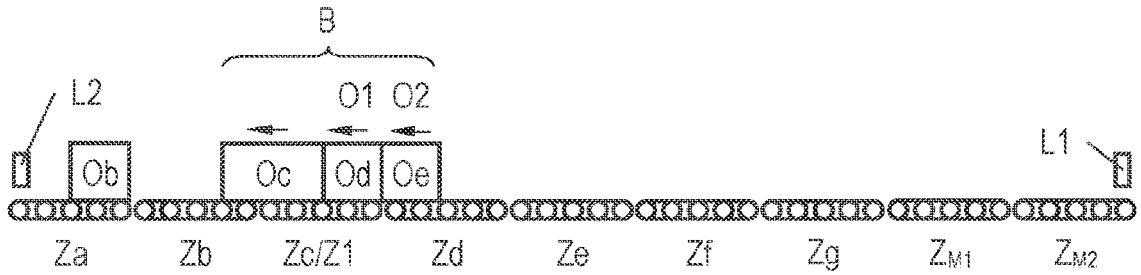
Figure 68:
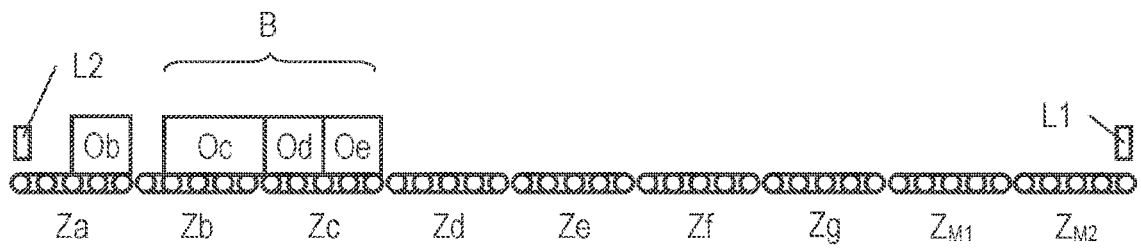
Figure 69:
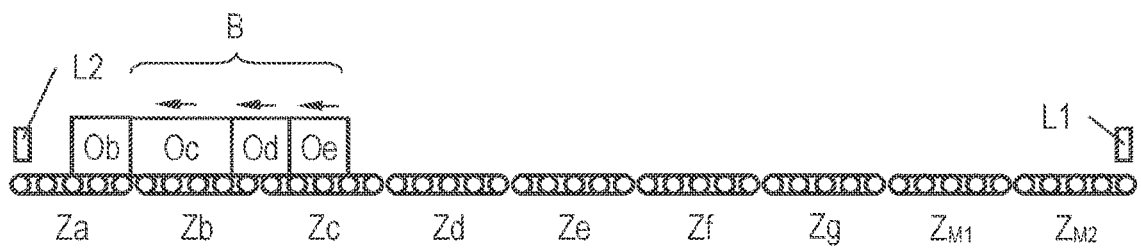

At a point in time shown in FIG. 67, the object Oe has reached the object block B. Subsequently, the object block B is enlarged in the manner already described. At a point in time shown in FIG. 68, the object block B has stopped with its block rear edge at the zone rear edge of zone Zc. This state is similar to the state shown in FIG. 50, 55 or 61.

Figure 70:
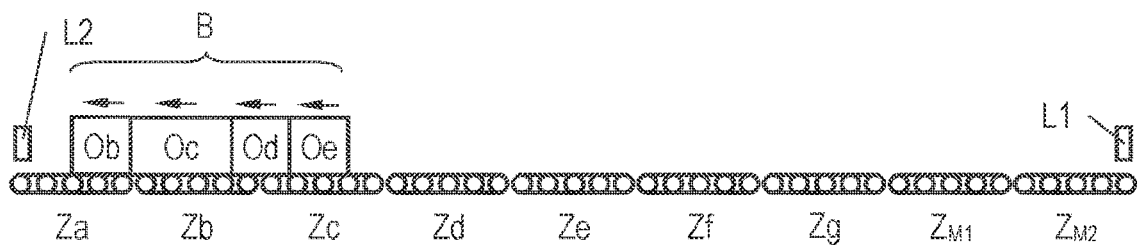

It is now assumed that a request to transport all objects Ob . . . Oe to the exit A of the conveying device 1 as an object block B follows. Hence, the object block B is set into motion and reaches the object Ob at a point in time shown in FIG. 69. Subsequently, the object Ob is added to the object block B, which is now transported out of the accumulation area SB, as is shown in FIG. 70.

Figure 71:
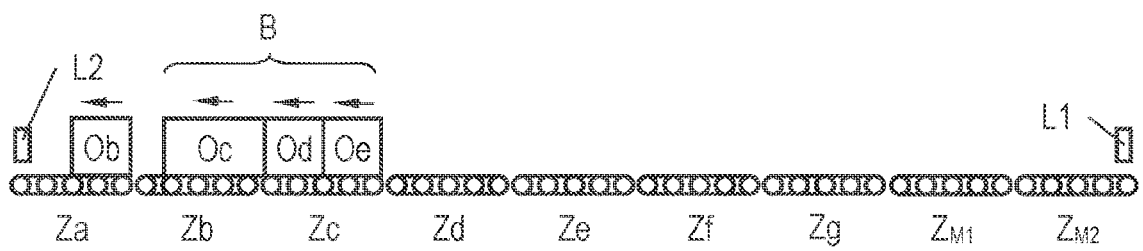
FIGS. 71 to 81 show an exemplary course of method for merging object blocks.
Figure 72:
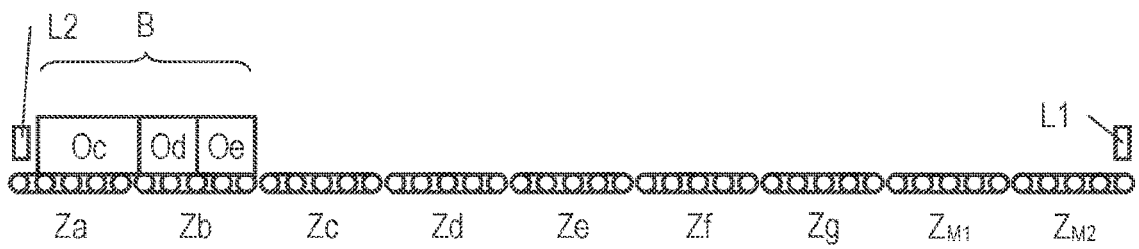

However, it is also conceivable that the object Ob is to be transported out of the accumulation area SB by itself. In this case, the objects Ob . . . Oe are again set into motion, wherein, however, the gap between the objects Ob and Oc is maintained, as is shown in FIG. 71. In this regard, the state shown in FIG. 71 follows the state shown in FIG. 68 in the course of the method. In FIG. 72, the object block B was subsequently stopped, such that the object rear edge of the object Oc comes to rest at the zone rear edge of zone Za.

In the course of the method described in FIGS. 73 to 82, the formation of multiple object blocks Ba, Bb as well as the combination of multiple blocks Ba, Bb is now described. In this regard, the state shown in FIG. 72 is taken as a starting point.

Figure 73:
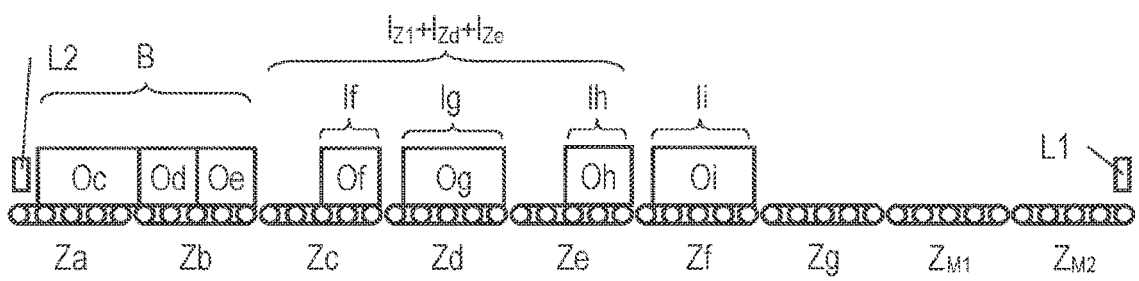
Figure 74:
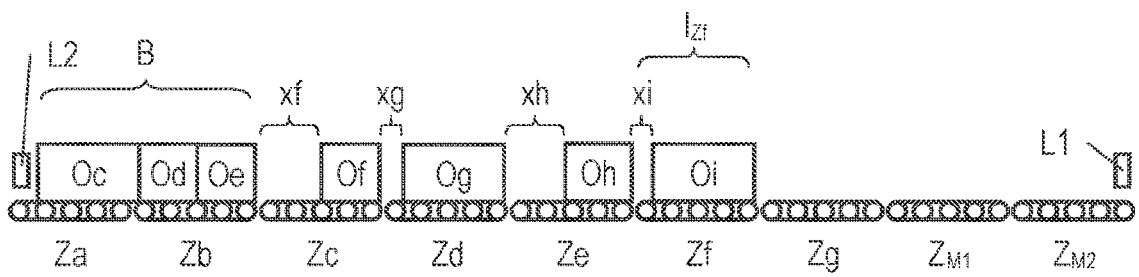
Figure 75:
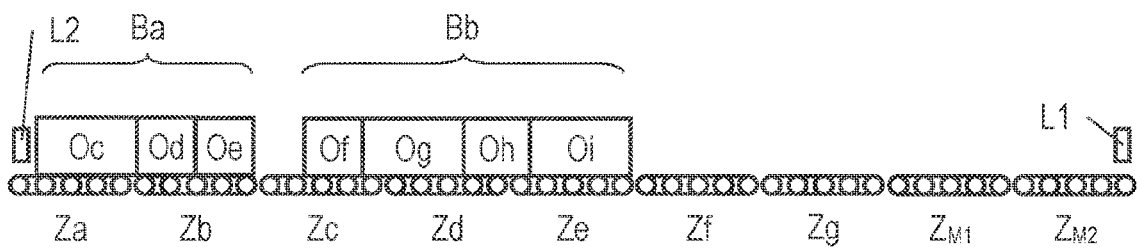

In the state shown in FIG. 73, multiple objects Of . . . Oi have stopped in zones Zc . . . Zf, each at their zone rear edge. The length lf . . . li determined with the aid of the light barrier L1 is now used for the check whether and/or which objects Of . . . Oi fit into a group of ones Zc . . . Zf. For this purpose, it is checked whether the total length lf+lg+lh+li of the objects Of . . . Oi is smaller than or equal to the total length $l_{Zc}+L_{Zd}+l_{Ze}$ of zones Zc . . . Ze. As this condition is fulfilled, an object block B is formed, which is positioned at the zone rear edge of zone Ze with its block rear edge and thus at a distance behind the object block Ba, as is shown in FIG. 75.

For the check whether and/or which objects Of . . . Oi fit into a group of zones Zc . . . Zf, the distances xf . . . xi determined with the aid of the light barrier L1 can also be used as an alternative. For this purpose, it is checked whether the sum of the distances xf+xg+xh+xi between the objects Of . . . Oi is greater than or equal to the length $l_{Zf}$ of a zone Zf (or also of multiple zones). Subsequently, an object block B can be formed again, which is positioned at the zone rear edge of zone Ze with its block rear edge and thus at a distance behind the object block Ba, as is shown in FIG. 75.

Figure 76:
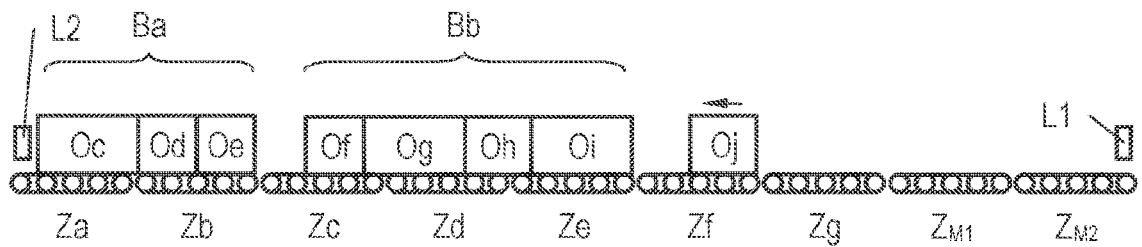
Figure 77:
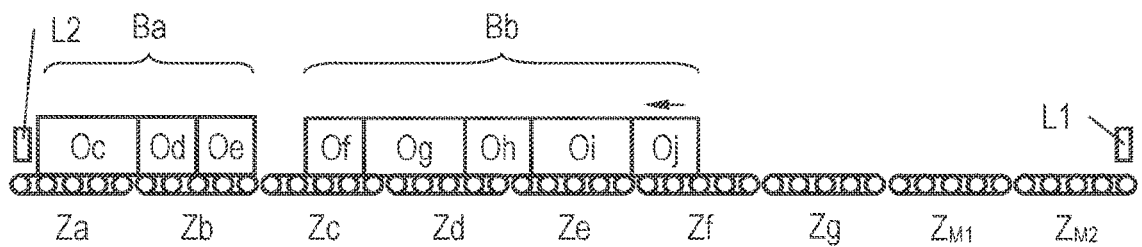

At a point in time shown in FIG. 76, a further object Oj moves towards the object block Bb. At a point in time shown in FIG. 77, the object Oj has reached the object block Bb and is added to the object block Bb in the manner already described.

Figure 78:
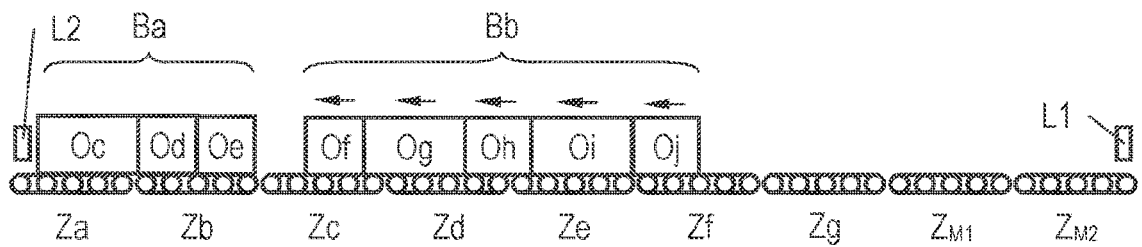
Figure 79:
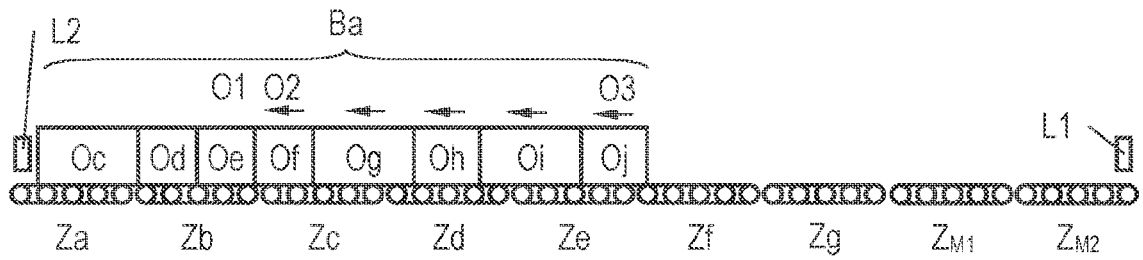

A further check shows that all objects Oc . . . Oj can be accommodated inside zones Za . . . Ze (for this, cf. the check options specified for FIGS. 73 and 74). Accordingly, the object block Bb is moved toward the object block Ba, as is shown in FIG. 78. At a point in time shown in FIG. 79, the object block Bb has reached the object block Ba. The two object blocks Ba and Bb are thus combined into one object block Ba. In this regard, the object Oe corresponds to a first object O1, the object Of corresponds to a second object O2 and the object Oj corresponds to a third object O3. The first object O1 forms the end of the object block Ba, the second object O2 forms the start of the object block Bb, and the third object forms the end of the object block Bb.

Figure 80:
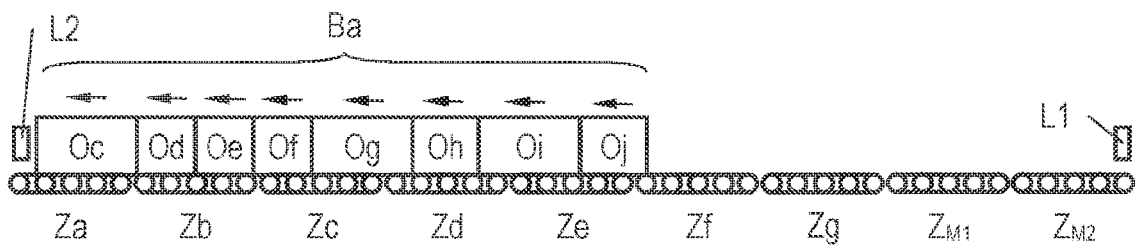
Figure 81:
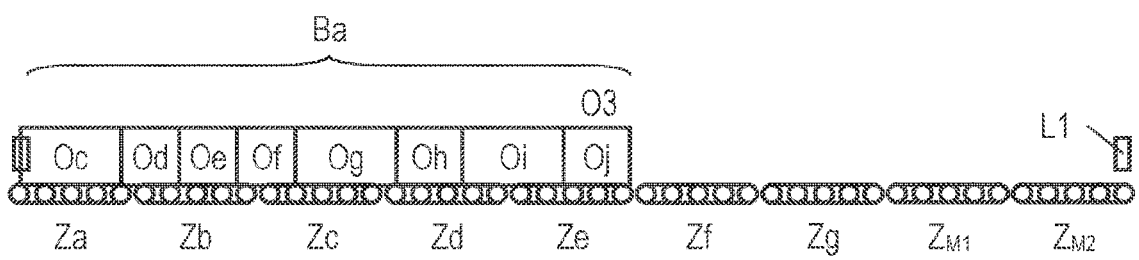

At a point in time shown in FIG. 80, the entire object block Ba is set into motion and transported downstream. At a point in time shown in FIG. 81, the object block Ba has stopped with its block rear edge at the zone rear edge of zone Ze. In this regard, the block rear edge $K_{HB}$ corresponds to the object rear edge of the third object O3, which is formed by the object Oj.

Figure 82:
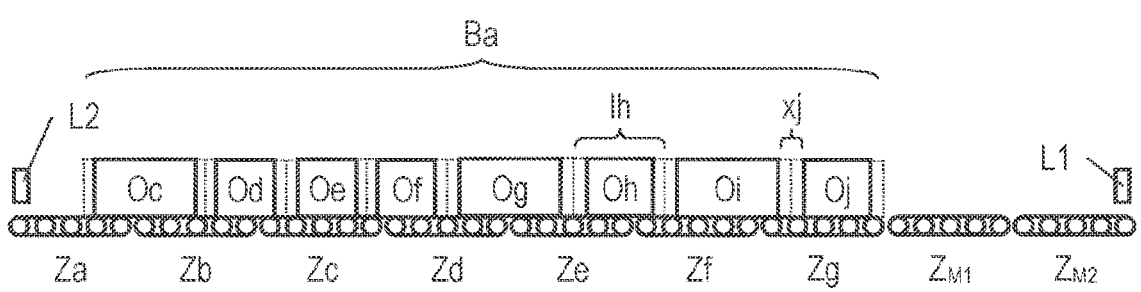
FIG. 82 shows an exemplary object block whose objects are virtually enlarged.

Finally, FIG. 82 shows an example, in which the objects Oc . . . Oj have been enlarged virtually (also cf. FIGS. 14 and 15). Accordingly, a virtual object length lh for example for the object Oh is given. Correspondingly, physically existent object distances xj are given, although the virtually elongated objects Oc . . . Oj stand closely together in terms of control technology. For the object block Ba shown in FIG. 81, the situation shown in FIG. 82 is now given.

At this point, it should be noted that the objects Oc . . . Oj may also be virtually reduced in size (also cf. FIGS. 12 and 13), in order to increase the accumulation pressure within the object block Ba, or to ensure the contact between the objects Oc . . . Oj, also with respect to inevitable positioning errors. However, in this case, the situation is equal to the situation shown in FIG. 81.

In summary, the suggested method for accumulating objects Oa . . . Oj in the accumulation area SB of the conveying device 1 in the form of object blocks B, Ba, Bb comprises the following steps:
  detecting the object rear edge $K_{HO1}$ of a first object O1 at the first measuring position $P_{Mess1}$ by means of the first measuring device L1, wherein the first object O1 is moved past the first measuring position $P_{Mess1}$ downstream in the conveying direction by the driven conveyor elements 2, $2_M$, $2_L$,
  detecting the object front edge $K_{VO}$ 2 of a second object O2, which follows the first object O2 upstream, at the first measuring position $P_{Mess1}$ by means of the first measuring device L1, wherein the second object O2 is moved past the first measuring position $P_{Mess1}$ downstream in the conveying direction by the driven conveyor elements 2, $2_M$, $2_L$,
  moving the first object O1 to a stop position $P_{Stop}$, which is located downstream of the first measuring position $P_{Mess1}$ in the conveying direction, and stopping the first object O1 with its object rear edge $K_{HO1}$ at a zone rear edge $K_{HZ1}$ of a first zone Z1 of the conveying device 1 in the accumulation area SB,
  moving the second object O2 downstream to the first object O1 with the aid of the conveying device 1,
  forming or enlarging an object block B, Ba, Bb with the first object O1 and the second object O2 after the second object O2 has been driven against the first object O1, or after the second object O2 has a predefinable distance to the first object O1 (cf. FIG. 82), and moving the object block B, Ba, Bb downstream in the conveying direction at a common actual speed with the aid of the conveying device 1, and
  stopping the object block B, Ba, Bb with the aid of the conveying device 1 when it reaches, with its block rear edge $K_{HB}$, a zone rear edge $K_{HZ1}$ of a zone Za . . . Zg following downstream or when it is positioned with its block rear edge HB at a distance downstream of one of said zone rear edges $K_{HZ1}$, which corresponds to less than or equal to a desired distance xj to a following object Oa . . . Oj.

At this point, it should be noted that the courses of the method described in FIGS. 16 to 82 can be applied in combination with the courses of the method described in FIGS. 1 to 15 or also solely. In other words, the two following steps and/or the measures suggested in claims 1 and 26 or advantageous yet optional:
  calculating a continuous curve of a speed reduction of a target speed $v_{Soil}$ for the second object O2 by the controller 5, wherein the calculated stop position $P_{Stop}$ of the object front edge $K_{VO2}$ of the second object O2 is located at the position of the object rear edge $K_{HO1}$ of the stopped first object O1, or between the object front edge $K_{VO1}$ and the object rear edge $K_{HO1}$ of the stopped first object O1, and
  moving and stopping the second object O2 with the aid of the conveyor elements 2, $2_M$, $2_L$ using the calculated speed reduction.

It should finally be noted that the scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

In particular, it should also be noted that the devices shown may in reality comprise more or fewer components than those shown. In some cases, the shown devices and/or their components may not be depicted to scale and/or be enlarged and/or reduced in size.

Although only a few embodiments of the present invention have been shown and described, it is to be understood that many changes and modifications may be made thereunto without departing from the spirit and scope of the invention.

LIST OF REFERENCE NUMBERS

1 Conveying device
2 Conveyor element (conveyor roller)
$2_M$ Motorized conveyor element (conveyor roller)
$2_L$ Non-motorized conveyor element (conveyor roller)
3 Longitudinal beam
4 Alignment element (alignment roller)
5 Controller
6 Belt/conveyor belt
M Drive
E Entry
A Exit
AB Alignment area
MB Measuring area
SB Accumulation area
RB Dissolving area
Z1 ... Z7, Za ... Zg Zone (in the accumulation area)
$Z_{M1}$, $Z_{M2}$ Zone (in the measuring area)
O, O1 ... O3, Oa ... Oj Object
B, Ba, Bb Object block
L1, L2 Measuring device (light barrier)
$P_{Mess1}$, $P_{Mess2}$ Measuring position
$P_{Stop}$ Stop position
$v_{Soll}$ Target speed
$v_{O1}$ Speed at object rear edge
$K_{VO}$, $K_{VO1}$, $K_{VO2}$ (physical) object front edge
$K_{HO}$, $K_{HO1}$, $K_{HO2}$ (physical) object rear edge
$G_{VO}$, $G_{VO1}$, $G_{VO2}$ (virtual) object front edge
$G_{HO}$, $G_{HO1}$, $G_{HO2}$ (virtual) object rear edge
$K_{HZ1}$ Zone rear edge
$K_{HB}$ Block rear edge
xf ... xi Object distance
$l_B$ Block length
$l_f$ ... $l_i$ Object length
$l_{Zf}$ ... $l_{Zg}$ Zone length

What is claimed is:

1. A method for accumulating objects in an accumulation area of a conveying device in the form of object blocks, which comprise multiple objects moved at a common speed, comprising the steps:
    detecting an object rear edge of a first object at a first measuring position by means of a first measuring device, wherein the first object is moved past the first measuring position downstream in a conveying direction by driven conveyor elements of the conveying device and wherein the object rear edge of the first object is located upstream of an object front edge of the first object,
    detecting an object front edge of a second object, which follows the first object upstream, at the first measuring position by means of the first measuring device, wherein the second object is moved past the first measuring position downstream in the conveying direction by the driven conveyor elements and wherein the object front edge of the second object is located downstream of an object rear edge of the second object, and
    moving the first object to a stop position, which is located downstream of the first measuring position in the conveying direction, and stopping the first object with its object rear edge at its stop position using the conveyor elements, wherein a current position of the first object, between the first measuring position and its stop position, is determined using rotation signals from the drives of the conveyor elements,
    wherein for the second object, a continuous curve of a speed reduction of a target speed is calculated by a controller, wherein the calculated stop position of the object front edge of the second object is located at the position of the object rear edge of the stopped first object, or between the object front edge of the stopped first object and the object rear edge of the stopped first object, and
    wherein the second object is moved and stopped using the conveyor elements using the calculated speed reduction, wherein a current position of the second object, between the first measuring position and its stop position, is determined using rotation signals from the drives of the conveyor elements.

2. The method according to claim 1, wherein the speed reduction has a linear course.

3. The method according to claim 1, wherein the speed reduction has a degressively extending section in the area of the position of the object rear edge of the stopped first object.

4. The method according to claim 1, wherein a position for the target speed zero is located downstream of the object rear edge of the stopped first object and the target speed at the object rear edge of the stopped first object amounts to a maximum of 0.1 m/s.

5. The method according to claim 1, wherein the first object and the second object are moved past the first measuring position at a constant speed.

6. The method according to claim 1, wherein the calculation of the speed reduction
    a) is based on a virtual object rear edge of the first object, which is located downstream of a physical object rear edge of the first object, and/or
    b) is based on a virtual object front edge of the second object, which is located upstream of a physical object front edge of the second object.

7. The method according to claim 1, wherein the calculation of the speed reduction
    c) is based on a virtual object rear edge of the first object, which is located upstream of a physical object rear edge of the first object, and/or
    d) is based on a virtual object front edge of the second object, which is located downstream of a physical object front edge of the second object.

8. The method according to claim 6, wherein the distance between the virtual object rear edge and the physical object rear edge of the first object and/or the distance between the virtual object front edge and the physical object front edge of the second object corresponds to the inaccuracy in the position determination of the first object and the second object by the measuring device plus a tolerance of ±10%.

9. The method according to claim 1, wherein a conveyor element arranged in the region of the first object is held in position after stopping of the first object.

10. The method according to claim 9, wherein a braking torque of a conveyor element arranged in the region of the first object is measured and the second object is stopped once the braking torque exceeds a first threshold value.

11. The method according to claim 9, wherein a braking torque of a conveyor element arranged in the region of the first object is measured and the second object, after contact with the first object, is moved back and stopped if the braking torque drops below a second threshold value.

12. The method according to claim 1, wherein conveyor elements arranged in the region of the first object are switched to freewheel mode after the first object has been stopped.

13. The method according to claim 1, wherein
the first object, when being stopped at its stop position using the conveyor elements, is stopped with its object rear edge at an upstream zone rear edge of a first zone of multiple independently drivable zones of the conveying device in the accumulation area,
the second object is moved towards the first object using the conveyor elements, and
the first object and the second object, after the second object has been driven against the first object, become part of an object block which is moved downstream in the conveying direction at a common actual speed using the conveyor elements,
wherein the object block is stopped using the conveyor elements when it reaches, with its block rear edge, the zone rear edge of a zone following downstream, wherein a current position of the block rear edge is determined using rotation signals from the drives of the conveyor elements.

14. The method according to claim 13, wherein
the block rear edge corresponds to the object rear edge of the second object if the second object is an isolated object before the second object becomes part of an object block together with the first object, and
the block rear edge corresponds to the object rear edge of a third object if the second object and the third object are already part of an object block before the first object is added to this object block, wherein the third object is arranged at the upstream end of the object block.

15. The method according to claim 13, wherein it is checked whether a group of successive objects, including the first and the second objects, fits into a zone or into a group of successive zones located downstream of the last object of the group, and an object block is formed from the objects of the group only if the result of the check is positive, and otherwise the second object is stopped with its object rear edge at a zone rear edge of a second zone of the accumulation area or is stopped at a distance downstream of one of said zone rear edges which corresponds to less than or equal to a desired distance to a following object, wherein the second zone is arranged behind the first zone.

16. The method according to claim 15, wherein the object block is formed without intermediate stop of the objects of the group following the first object when the result of the check is positive.

17. The method according to claim 13, wherein all objects are stopped successively in time in the same zone, said zone being arranged in particular directly behind a measuring area containing the first measuring device.

18. The method according to claim 13, wherein the objects are stopped in different zones, in particular starting at the downstream end of the accumulation area.

19. The method according to claim 13, wherein an object leading in the accumulation area does not become part of an object block or is isolated therefrom.

20. The method according to claim 19, wherein an object following the leading object is detached from an object block and moves to the downstream end of the accumulation area if it is part of an object block and if the leading object leaves the accumulation area.

21. The method according to claim 19, wherein objects following the leading object are detached from an object block if these are part of an object block and are to leave the accumulation area as planned together with the leading object, wherein the detachment from the object block takes place when the object rear edge of the last object of the object block to be detached reaches a zone rear edge of a zone.

22. The method according to claim 19, wherein at least one object following the leading object drives against the leading object if said objects are to leave the accumulation area as an object block as planned.

23. The method according to claim 13, wherein an object block is formed merely up to a maximum length.

24. The method according to claim 13, wherein it comprises multiple operating modes selectable from the group of:
a method wherein all objects are stopped successively in time in the same zone, said zone being arranged in particular directly behind a measuring area containing the first measuring device,
a method wherein the objects are stopped in different zones, in particular starting at the downstream end of the accumulation area,
a method wherein all objects are stopped successively in time in the same zone, said zone being arranged in particular directly behind a measuring area containing the first measuring device, in combination with a method wherein an object leading in the accumulation area does not become part of an object block or is isolated therefrom;
a method wherein the objects are stopped in different zones, in particular starting at the downstream end of the accumulation area, in combination with a method wherein an object leading in the accumulation area does not become part of an object block or is isolated therefrom,
between which switching is possible.

25. A conveying device for a conveyor system for accumulating objects in an accumulation area in the form of object blocks, which comprise multiple objects moved at a common speed, comprising:
driven conveyor elements for transporting the objects,
a first measuring device for detecting an object front edge and an object rear edge of the objects at a first measuring position, wherein the object front edge is located downstream of the object rear edge of the object in the conveying direction, and
a controller which is configured for controlling drives of the conveyor elements according to a predefined target movement of the objects, for moving a first object to a stop position using the conveyor elements, said stop position being arranged downstream of the first measuring position in the conveying direction, to stop the first object with its object rear edge at its stop position, and to determine a current position of the first object between the first measuring position and its stop position using rotation signals from the drives of the conveyor elements, wherein the controller is further configured for calculating a continuous curve of a speed reduction of a target speed for a second object, wherein the calculated stop position of the object front edge of the second object is located at the position of the object rear edge of the stopped first object, or between the object front edge of the stopped first object and the object rear edge of the stopped first object, and controlling the drives of the conveyor elements according to the calculated curve of the speed reduction, stopping the second object behind the first object using the calculated speed reduction and determining a current position of the second object, between the first measuring position and its stop position, using rotation signals from the drives of the conveyor elements.

26. The conveying device according to claim 25, wherein the controller is further configured for stopping the first object, when being stopped at its stop position, using the conveyor elements with its object rear edge at an upstream zone rear edge of a first zone of multiple independently drivable zones of the conveying device in the accumulation area, moving the second object towards the first object using the conveyor elements, moving the first object and the second object, after the second object has been driven against the first object, downstream in the conveying direction at a common actual speed as an object block using the conveyor elements, stopping the object block using the conveyor elements when it reaches, with its block rear edge, the zone rear edge of a zone following downstream, and determining a current position of the block rear edge using rotation signals from the drives of the conveyor elements.

27. The conveying device according to claim 25, further comprising a measuring area which is arranged upstream of the accumulation area and in which the object front edge and the object rear edge of an object are detected by the first measuring device.

28. The conveying device according to claim 25, wherein at least one second measuring position is arranged downstream of the first measuring position in the detection area of the first measuring device or of a second measuring device, and the controller is additionally configured for resetting the current position of an object determined using the rotation signals from the drives of the conveyor elements to the value of the second measuring position if the respective object is detected at the second measuring position.

29. The conveying device according to claim 25, wherein a light barrier, a camera or a laser scanner is provided as the measuring device.

* * * * *

UNITED STATES PATENT AND TRADEMARK OFFICE
CERTIFICATE OF CORRECTION

PATENT NO. : 12,091,260 B2
APPLICATION NO. : 18/218650
DATED : September 17, 2024
INVENTOR(S) : Manuel Schoenbauer et al.

It is certified that error appears in the above-identified patent and that said Letters Patent is hereby corrected as shown below:

In the Claims

In Column 30, Line 42 (Line 17 of Claim 24), after "therefrom" please change ";" to correctly read:
-- , --

Signed and Sealed this
Fifteenth Day of October, 2024

Katherine Kelly Vidal
*Director of the United States Patent and Trademark Office*